(12) United States Patent
Lee et al.

(10) Patent No.: US 10,528,786 B2
(45) Date of Patent: Jan. 7, 2020

(54) APPARATUS AND METHOD FOR RECEIVING FINGERPRINT INFORMATION THROUGH GUIDE

(71) Applicant: Samsung Electronics Co., Ltd., Suwon-si, Gyeonggi-do (KR)

(72) Inventors: Hee Kuk Lee, Suwon-si (KR); Dae Kyu Shin, Suwon-si (KR); Hyeong Wook Yang, Anyang-si (KR); Yu Min Jung, Suwon-si (KR); Pil Joo Yoon, Seongnam-si (KR); Hae Dong Lee, Daegu (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/354,598

(22) Filed: Mar. 15, 2019

(65) Prior Publication Data

US 2019/0213381 A1 Jul. 11, 2019

Related U.S. Application Data

(63) Continuation of application No. 15/674,928, filed on Aug. 11, 2017.

(30) Foreign Application Priority Data

Sep. 20, 2016 (KR) .................. 10-2016-0120280

(51) Int. Cl.
  *G06K 9/00* (2006.01)
  *G06F 21/32* (2013.01)
  *G06T 1/00* (2006.01)

(52) U.S. Cl.
  CPC ......... *G06K 9/00046* (2013.01); *G06F 21/32* (2013.01); *G06K 9/0004* (2013.01);
  (Continued)

(58) Field of Classification Search
  CPC ...... G06K 9/00046; G06K 9/00; G06F 21/32; G06T 1/00
  See application file for complete search history.

(56) References Cited

U.S. PATENT DOCUMENTS 9,336,428 B2 5/2016 Erhart
9,547,789 B2 1/2017 Park et al.
(Continued)

FOREIGN PATENT DOCUMENTS

KR 10-2015-0018349 A 2/2015
KR 10-2015-0098158 A 8/2015
(Continued)

OTHER PUBLICATIONS

International Search Report dated Nov. 22, 2017, issued in the International Application No. PCT/KR2017/008792 filed on Aug. 11, 2017.
(Continued)

*Primary Examiner* — Ruiping Li
(74) *Attorney, Agent, or Firm* — Jefferson IP Law, LLP

(57) ABSTRACT

An electronic apparatus is provided. The electronic device includes a display, a fingerprint sensor disposed under the display, and a processor electrically connected with the display and the fingerprint sensor. The processor is configured to set a fingerprint sensing region at a location, which corresponds to a location where the fingerprint sensor is disposed, on the display if the electronic apparatus enters a state for registering a fingerprint of a finger, to display a first guide on the display such that the first guide at least partly overlaps the fingerprint sensing region, to obtain first fingerprint information through the fingerprint sensing region if the finger touches the first guide, to display a second guide on the display such that the second guide at least partly overlaps the fingerprint sensing region, and to obtain second
(Continued)

fingerprint information through the fingerprint sensing region if the finger touches the second guide.

35 Claims, 21 Drawing Sheets

(52) U.S. Cl.
CPC ..... *G06K 9/00013* (2013.01); *G06K 9/00912* (2013.01); *G06K 9/00* (2013.01); *G06T 1/00* (2013.01)

(56) References Cited

U.S. PATENT DOCUMENTS

| | | | |
|---|---|---|---|
| 9,633,248 B2 | 4/2017 | Kim et al. | |
| 9,996,759 B2 | 6/2018 | Lee et al. | |
| 10,055,634 B2 | 8/2018 | Han et al. | |
| 10,262,182 B2 | 4/2019 | Han et al. | |
| 2011/0102567 A1 | 5/2011 | Erhart | |
| 2011/0102569 A1 | 5/2011 | Erhart | |
| 2015/0074615 A1* | 3/2015 | Han | G06K 9/00033 715/863 |
| 2015/0131876 A1 | 5/2015 | Chang | |
| 2015/0131878 A1 | 5/2015 | Kim et al. | |
| 2015/0146945 A1 | 5/2015 | Han et al. | |
| 2015/0235098 A1 | 8/2015 | Lee et al. | |
| 2016/0063298 A1 | 3/2016 | Tuneld et al. | |
| 2016/0171281 A1* | 6/2016 | Park | G06F 1/1643 382/124 |
| 2016/0203354 A1 | 7/2016 | Choi et al. | |
| 2016/0239701 A1 | 8/2016 | Lee et al. | |
| 2016/0253544 A1 | 9/2016 | Weber et al. | |
| 2016/0321494 A1 | 11/2016 | Shin et al. | |
| 2017/0220842 A1 | 8/2017 | Thompson et al. | |
| 2018/0253586 A1 | 9/2018 | Shin et al. | |
| 2018/0253614 A1 | 9/2018 | Lee et al. | |
| 2018/0276356 A1 | 9/2018 | Kim | |

FOREIGN PATENT DOCUMENTS

| | | | |
|---|---|---|---|
| KR | 10-2016-0054573 A | 5/2016 | |
| KR | 10-2016-0071887 A | 6/2016 | |
| KR | 10-20160128872 A | 11/2016 | |
| KR | 10-20180052598 A | 5/2018 | |

OTHER PUBLICATIONS

Korean Notice of Preliminary Examination Result dated Apr. 11, 2019, issued in Korean Patent Application No. 10-2016-0120280.
Korean Notice of Allowance dated Jun. 17, 2019, issued in Korean Patent Application No. 10-2016-0120280.
Extended European Search Report dated Jul. 17, 2019, issued in European Patent Application No. 17853290.9-1207.

* cited by examiner

APPARATUS AND METHOD FOR RECEIVING FINGERPRINT INFORMATION THROUGH GUIDE

CROSS-REFERENCE TO RELATED APPLICATION(S)

This application is a continuation application of prior application Ser. No. 15/674,928, filed on Aug. 11, 2017, and was based on and claimed priority under 35 U.S.C. § 119(a) of a Korean patent application filed on Sep. 20, 2016 in the Korean Intellectual Property Office and assigned Serial number 10-2016-0120280, the entire disclosure of which is hereby incorporated by reference.

TECHNICAL FIELD

The present disclosure relates to a technology that processes user registration and fingerprint information in an electronic apparatus.

BACKGROUND

With the development of technologies recognizing biometric information, an electronic apparatus including a biometric sensor such as a fingerprint sensor, an iris sensor, or the like has been widely distributed. The electronic apparatus may recognize biometric information of a user by using the biometric sensor and may store the biometric information of the user in an internal memory therein. The stored biometric information may be used when the user unlocks a screen or makes a financial transaction (e.g., transferring money, making an electronic payment).

The fingerprint sensor may set a point, at which a fingerprint ridge is divided or broken, to a minutia and may obtain distribution of minutiae, the number of minutiae, or the like from a fingerprint. The fingerprint sensor may determine whether the fingerprint is authenticated, by comparing the distribution of minutiae or the number of minutiae stored in a memory with the distribution of minutiae or the number of minutiae that is newly recognized.

Since the electronic apparatus needs elements such as a display, a printed circuit board (PCB), a battery, and the like in addition to the fingerprint sensor, there may not be enough space for mounting the fingerprint sensor. In addition, in the case where a fingerprint sensor, the size is big, is mounted in the electronic apparatus, the cost of production may increase. Accordingly, there is a need to mount a fingerprint sensor, the size is small, in the electronic apparatus.

If the size of fingerprint sensor is less than the size of a finger, a procedure of recognizing different regions of the finger by using the fingerprint sensor may be repeated to obtain a fingerprint image. Furthermore, in the repeated procedure of recognizing the different regions of the finger, there is a need for the user to properly move a location, a direction, or the like of the finger to obtain the entire fingerprint image of the finger.

However, the user may allow the fingerprint sensor to continuously recognize the fingerprint at the same location. Alternatively, the user may continuously allow the electronic apparatus to continuously recognize the same fingerprint region of the fingerprint. If the user allows the electronic apparatus to continuously recognize a fingerprint at the same location or if the user allows the electronic apparatus to continuously recognize the same fingerprint region, the electronic apparatus may not obtain the entire fingerprint image.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an electronic apparatus for solving the above-described problem and problems brought up in this specification.

In accordance with an aspect of the present disclosure, an electronic apparatus is provided. The electronic device includes a display, a fingerprint sensor disposed under the display, and a processor electrically connected with the display and the fingerprint sensor. The processor is configured to set a fingerprint sensing region at a location, corresponding to a location the fingerprint sensor is disposed, on the display if the electronic apparatus enters a state for registering a fingerprint of a finger, to display a first guide on the display such that the first guide at least partly overlaps the fingerprint sensing region, to obtain first fingerprint information through the fingerprint sensing region if the finger touches the first guide, to display a second guide on the display such that the second guide at least partly overlaps the fingerprint sensing region, and to obtain second fingerprint information through the fingerprint sensing region if the finger touches the second guide.

In accordance with another aspect of the present disclosure, an electronic apparatus is provided. The electronic device includes a display, a fingerprint sensor disposed under the display, a processor electrically connected with the display and the fingerprint sensor. The processor is configured to set a fingerprint sensing area at a location, corresponding to a location the fingerprint sensor is disposed, on the display, to display a first guide on the display such that the first guide at least partly overlaps the fingerprint sensing region, to obtain a contact region in which a finger touches the display, if the finger touches the display, to display a second guide on the display based on a location of the first guide and a location of the contact region, and to obtain fingerprint information about a fingerprint of the finger by using the second guide.

In accordance with another aspect of the present disclosure, a method for operating an electronic apparatus is provided. The method includes, if the electronic apparatus enters a state for registering a fingerprint of a finger, setting a fingerprint sensing region at a location, corresponding to a location a fingerprint sensor is disposed, on a display, displaying a first guide on the display such that the first guide at least partly overlaps the fingerprint sensing region, obtaining first fingerprint information through the fingerprint sensing region if the finger touches the first guide, displaying a second guide on the display such that the second guide at least partly overlaps the fingerprint sensing region, and obtaining second fingerprint information through the fingerprint sensing region if the finger touches the second guide.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
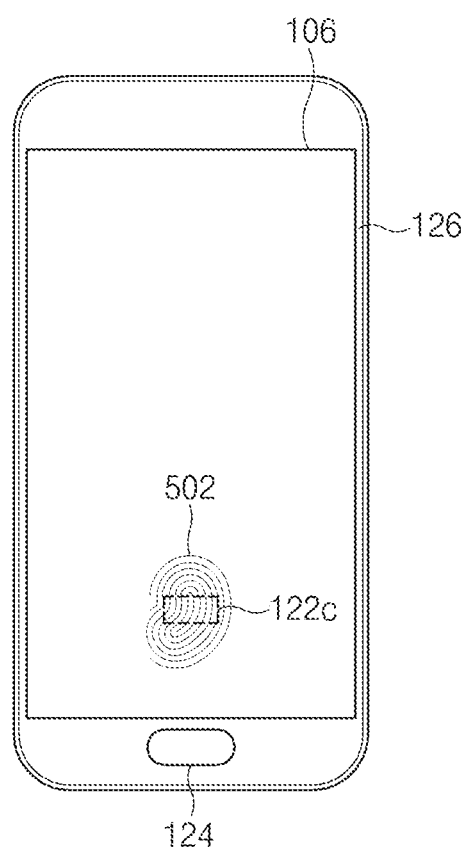
FIG. 1 illustrates an electronic apparatus according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In this disclosure, the expressions "have", "may have", "include" and "comprise", or "may include" and "may comprise" used herein indicate existence of corresponding features (e.g., elements such as numeric values, functions, operations, or components) but do not exclude presence of additional features.

In this disclosure, the expressions "A or B", "at least one of A or/and B", or "one or more of A or/and B", and the like may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used in this disclosure may be used to refer to various elements regardless of the order and/or the priority and to distinguish the relevant elements from other elements, but do not limit the elements. For example, "a first user device" and "a second user device" indicate different user devices regardless of the order or priority. For example, without departing the scope of the present disclosure, a first element may be referred to as a second element, and similarly, a second element may be referred to as a first element.

It will be understood that when an element (e.g., a first element) is referred to as being "(operatively or communicatively) coupled with/to" or "connected to" another element (e.g., a second element), it may be directly coupled with/to or connected to the other element or an intervening element (e.g., a third element) may be present. In contrast, when an element (e.g., a first element) is referred to as being "directly coupled with/to" or "directly connected to" another element (e.g., a second element), it should be understood that there are no intervening element (e.g., a third element).

According to the situation, the expression "configured to" used in this disclosure may be used as, for example, the expression "suitable for", "having the capacity to", "designed to", "adapted to", "made to", or "capable of". The term "configured to" must not mean only "specifically designed to" in hardware. Instead, the expression "a device configured to" may mean that the device is "capable of" operating together with another device or other components. For example, a "processor configured to (or set to) perform A, B, and C" may mean a dedicated processor (e.g., an embedded processor) for performing a corresponding operation or a generic-purpose processor (e.g., a central processing unit (CPU) or an application processor) which performs corresponding operations by executing one or more software programs which are stored in a memory device.

Terms used in this disclosure are used to describe specified embodiments and are not intended to limit the scope of the present disclosure. The terms of a singular form may include plural forms unless otherwise specified. All the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal unless expressly so defined in various embodiments of this disclosure. In some cases, even if terms are terms which are defined in this disclosure, they may not be interpreted to exclude embodiments of this disclosure.

An electronic device according to various embodiments of this disclosure may include at least one of, for example, smartphones, tablet personal computers (PCs), mobile phones, video telephones, electronic book readers, desktop PCs, laptop PCs, netbook computers, workstations, servers, personal digital assistants (PDAs), portable multimedia players (PMPs), motion picture experts group (MPEG-1 or MPEG-2) Audio Layer 3 (MP3) players, mobile medical devices, cameras, or wearable devices. According to various embodiments, the wearable device may include at least one of an accessory type (e.g., watches, rings, bracelets, anklets, necklaces, glasses, contact lens, or head-mounted-devices (HMDs), a fabric or garment-integrated type (e.g., an electronic apparel), a body-attached type (e.g., a skin pad or tattoos), or a bio-implantable type (e.g., an implantable circuit).

According to various embodiments, the electronic device may be a home appliance. The home appliances may include at least one of, for example, televisions (TVs), digital versatile disc (DVD) players, audios, refrigerators, air conditioners, cleaners, ovens, microwave ovens, washing machines, air cleaners, set-top boxes, home automation control panels, security control panels, TV boxes (e.g., Samsung HomeSync™, Apple TV™, or Google TV™), game consoles (e.g., Xbox™ or PlayStation™), electronic dictionaries, electronic keys, camcorders, electronic picture frames, and the like.

According to another embodiment, an electronic device may include at least one of various medical devices (e.g., various portable medical measurement devices (e.g., a blood glucose monitoring device, a heartbeat measuring device, a blood pressure measuring device, a body temperature measuring device, and the like), a magnetic resonance angiography (MRA), a magnetic resonance imaging (MRI), a computed tomography (CT), scanners, and ultrasonic devices), navigation devices, Global Navigation Satellite System (GNSS), event data recorders (EDRs), flight data recorders (FDRs), vehicle infotainment devices, electronic equipment for vessels (e.g., navigation systems and gyrocompasses), avionics, security devices, head units for vehicles, industrial or home robots, automatic teller's machines (ATMs), points of sales (POSs) of stores, or internet of things (e.g., light bulbs, various sensors, electric or gas meters, sprinkler devices, fire alarms, thermostats, street lamps, toasters, exercise equipment, hot water tanks, heaters, boilers, and the like).

According to an embodiment, the electronic device may include at least one of parts of furniture or buildings/structures, electronic boards, electronic signature receiving devices, projectors, or various measuring instruments (e.g., water meters, electricity meters, gas meters, or wave meters, and the like). According to various embodiments, the electronic device may be one of the above-described devices or a combination thereof. An electronic device according to an embodiment may be a flexible electronic device. Furthermore, an electronic device according to an embodiment of this disclosure may not be limited to the above-described electronic devices and may include other electronic devices and new electronic devices according to the development of technologies.

Hereinafter, electronic devices according to various embodiments will be described with reference to the accompanying drawings. In this disclosure, the term "user" may refer to a person who uses an electronic device or may refer to a device (e.g., an artificial intelligence electronic device) that uses the electronic device.

FIG. 1 illustrates an electronic apparatus 100, according to an embodiment of the present disclosure.

Referring to FIG. 1, the electronic apparatus 100 may include a display 106, a bezel 126, and a button 124.

The display 106 may display a guide 502 (or a graphic indicator) so as to at least partly overlap a fingerprint sensing region 122c. If the display 106 displays the guide 502, a user may touch the guide 502 with his/her finger, and a processor may obtain fingerprint information through a part in which the guide 502 overlaps the fingerprint sensing region 122c.

In the present disclosure, the guide 502 may be a mark that guides the user to touch the display 106 with his/her finger. The guide 502 is illustrated in FIG. 1 as being in a shape of a fingerprint. However, the form of the guide 502 is not limited in an example illustrated in FIG. 1. The fingerprint sensing region 122c may be a region that corresponds to a fingerprint sensor 122a disposed under the display 106. The fingerprint sensing region 122c may be directly displayed on the display 106 or may not be displayed. A location at which the fingerprint sensing region 122c is formed may be an active area or a black matrix area of the display 106.

The bezel 126 may be disposed on a side surface of the display 106 and may be coupled with a housing. The bezel 126 may include a non-metal region and may be composed of, for example, a plastic injection mold. Although not illustrated in FIG. 1, a receiver, a proximity sensor, a camera, or the like may be disposed in a partial region of the bezel 126.

The button 124 disposed in the partial region of the bezel 126 may control the electronic apparatus 100. For example, the button 124 may be referred to as a home button, a back button, or a menu button. In the case where the button 124 is a home button, if the user presses the button 124, a home screen may be output through the display 106.

The electronic apparatus 100 is illustrated in FIG. 1 as including the display 106, the bezel 126, and the button 124. However, the electronic apparatus 100 may be of a full front screen form. In the case where the electronic apparatus 100 is of the full front screen form, the display 106 may be disposed on a front surface of the electronic apparatus 100 without the bezel 126 and the button 124.

Figure 2:
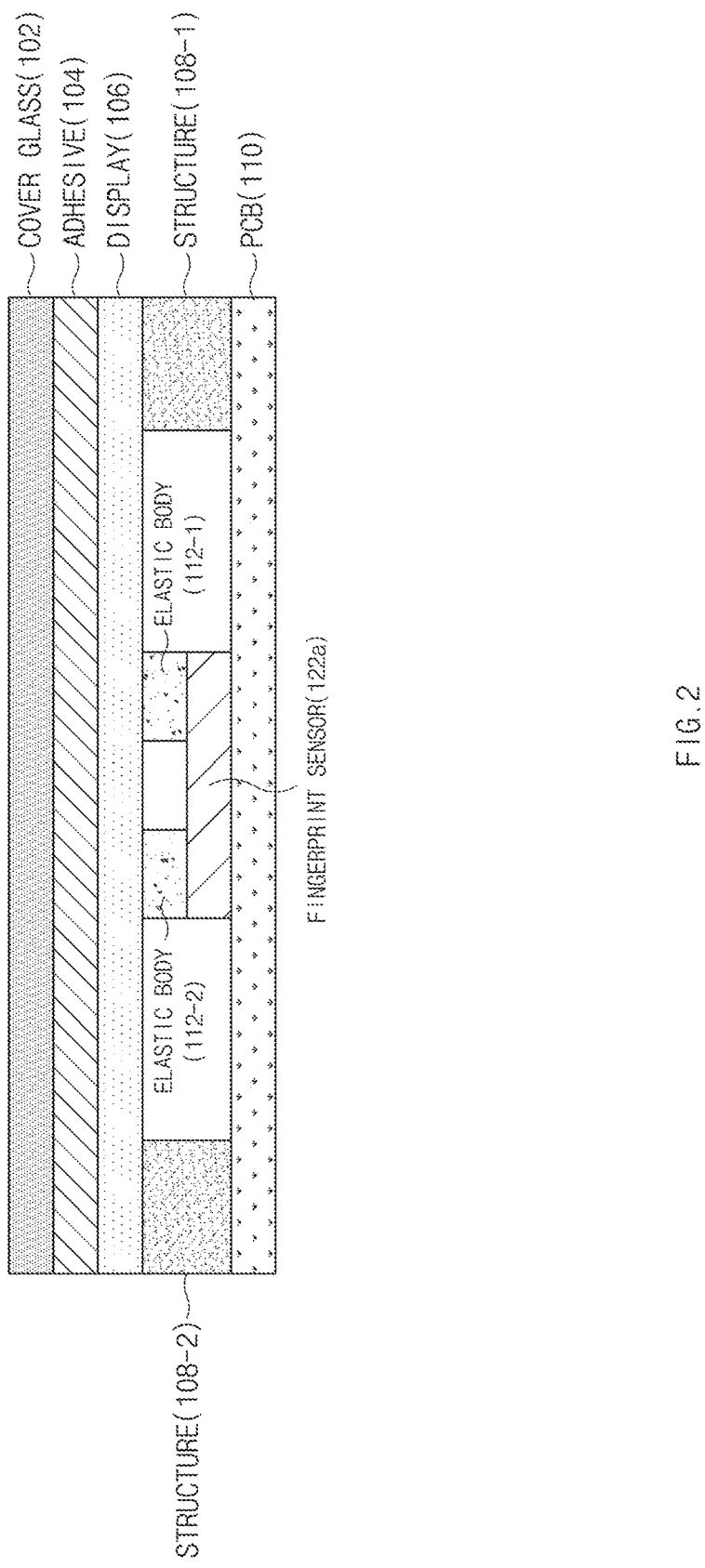
FIG. 2 illustrates a sectional view of an electronic apparatus according to an embodiment of the present disclosure.

FIG. 2 illustrates a sectional view of the electronic apparatus 100, according to an embodiment of the present disclosure.

Referring to FIG. 2, the electronic apparatus 100 may further include a cover glass 102, an adhesive 104, structures 108-1 and 108-2, a PCB 110, elastic bodies 112-1 and 112-2, and the fingerprint sensor 122a.

The cover glass 102 may transmit light generated by the display 106. Also, a user may touch the cover glass 102 with a portion (e.g., a finger) of his/her body to make a touch (including a contact using an electronic pen). The cover glass 102 may be form of, for example, tempered glass, reinforced plastic, a flexible polymer material, or the like and may protect the display 106 or each element included in the electronic apparatus 100 from an external shock. According to an embodiment, the cover glass 102 may be also referred to as a "glass window".

The adhesive 104 may allow the cover glass 102 and the display 106 to be attached to each other. The adhesive 104 may include a transparent film such that light generated by the display 106 is transmitted. For example, the adhesive 104 may be referred to as an optical clear adhesive film.

The structures 108-1 and 108-2 may be a configuration for securing a space in which the fingerprint sensor 122a is mounted. According to an embodiment, the structure 108-1 and 108-2 may be referred to as a bracket. The structures 108-1 and 108-2 may be composed of a magnesium alloy and may be physically coupled to the display 106 and the PCB 110 so as to support the display 106 and the PCB 110.

The PCB 110 may be disposed below the structure 108-1 and 108-2 and may be electrically connected with the display 106 and the fingerprint sensor 122a through a specified connector or specified wiring. For example, the PCB 110 may be implemented with a rigid PCB. According to an embodiment, various electronic components, elements, printed circuits, and the like of the electronic apparatus 100 may be mounted or arranged on the PCB 110.

The elastic bodies 112-1 and 112-2 may be interposed between the fingerprint sensor 122a and the display 106, and may absorb shock between the display 106 and the fingerprint sensor 122a. For example, the elastic bodies 112-1 and 112-2 may be formed of sponge, rubber, or the like. The elastic bodies 112-1 and 112-2 may prevent a foreign object from entering the fingerprint sensor 122a.

The fingerprint sensor 122a interposed between the display 106 and the PCB 110 may obtain fingerprint information of a finger contacting the display 106. The fingerprint sensor 122a is illustrated in FIG. 2 as being interposed between the display 106 and the PCB 110. However, the fingerprint sensor 122a may be disposed in the display 106, and may be interposed between the cover glass 102 and the display 106. The size of the fingerprint sensor 122a may be less than the size of the display 106 or may be the same as the size of the display 106. In the case where the size of the fingerprint sensor 122a is the same as the size of the display 106, the electronic apparatus 100 may obtain fingerprint information through the entire region of the display 106.

The number of the fingerprint sensor 122a may be one, or may be two or more. If the number of the fingerprint sensor 122a is two or more, the electronic apparatus 100 may obtain fingerprint information in a plurality of regions. The fingerprint sensor 122a may be an optical image sensor, an ultrasonic sensor, or an electrostatic sensor. The type of the fingerprint sensor 122a is not limited to the above-described examples.

Figure 3:
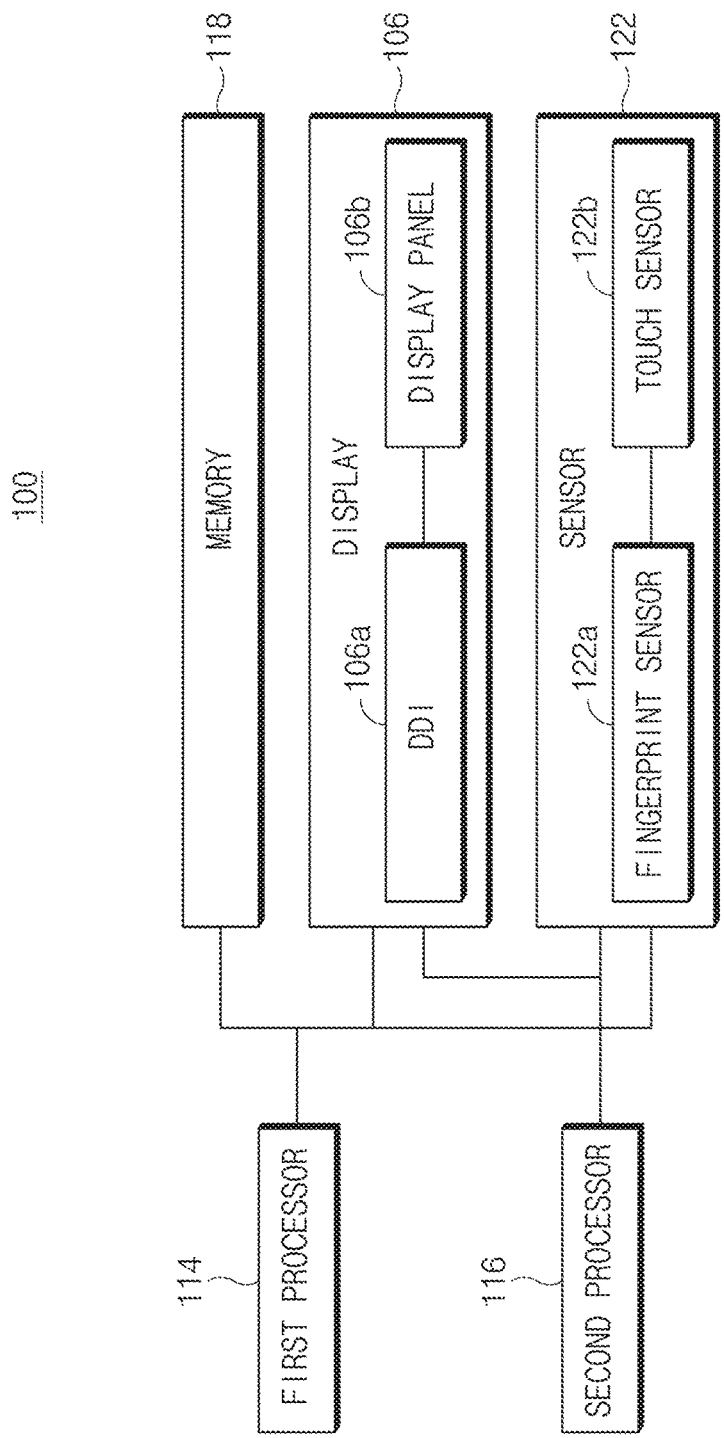
FIG. 3 illustrates a block diagram of an electronic apparatus according to an embodiment of the present disclosure.

FIG. 3 illustrates a block diagram of the electronic apparatus 100, according to an embodiment of the present disclosure.

Referring to FIG. 3, the electronic apparatus 100 may include a first processor 114, a second processor 116, a memory 118, the display 106, and a sensor 122.

The first processor 114 may be connected with the memory 118, the display 106, and the sensor 122 to control each of the memory 118, the display 106, and the sensor 122. For example, the first processor 114 may turn on/off the display 106 by using an instruction stored in the memory 118. In the case where the electronic apparatus 100 operates in a low-power mode, the second processor 116 may control each of the display 106 and the sensor 122. For example, if a user touches the display 106 with his/her finger, the second processor 116 may obtain fingerprint information through the fingerprint sensor 122a. If the user touches the display 106 with an object (e.g., a touch pen), the second processor 116 may sense a location of the object through a touch sensor 122b.

The memory 118 may store instructions for controlling the display 106, the sensor 122, and the like. According to an embodiment, the memory 118 may include a normal region for storing a user application or the like or a security region for storing information (e.g., information obtained through the fingerprint sensor 122a) sensitive to security.

The display 106 may include a display driver integrated circuit (DDI) 106a and a display panel 106b. The display panel 106b may include a plurality of pixels. The DDI 106a may electrically connect a processor with the display panel 106b. The DDI 106a may control at least a part of a plurality of pixels included in the display panel 106b to display an image.

The sensor 122 may include the fingerprint sensor 122a and the touch sensor 122b. The sensor 122 may further include an iris sensor that obtains iris information of the user. The fingerprint sensor 122a obtains fingerprint information of a user. According to an embodiment, the fingerprint sensor 122a may obtain biometric information by using light irradiated by the display 106. The touch sensor 122b may sense a location at which the user touches the display 106.

Figure 4:
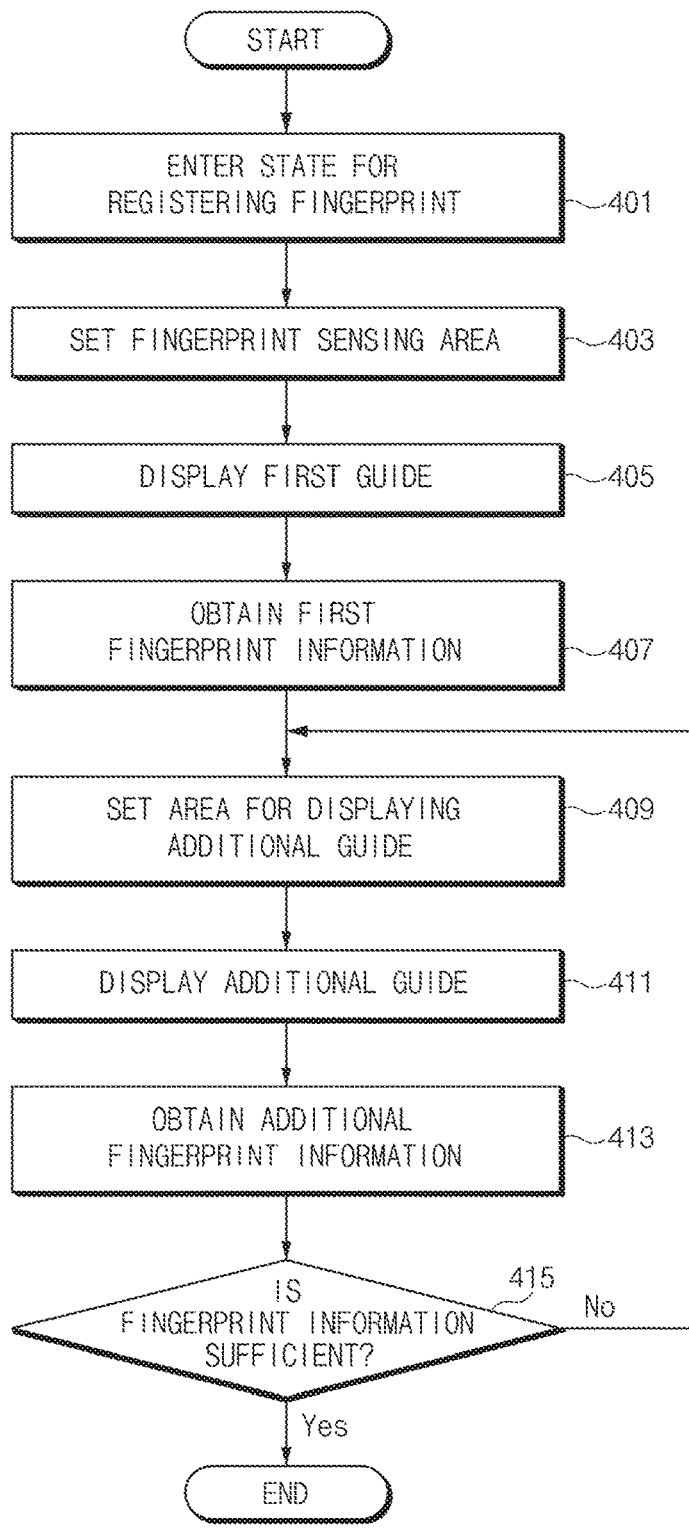
FIG. 4 illustrates an operation flowchart of an electronic apparatus according to an embodiment of the present disclosure.

FIG. 4 illustrates an operation flowchart of the electronic apparatus 100, according to an embodiment of the present disclosure. In this disclosure, details described with reference to FIGS. 1 to 3 may be identically applied to elements that have the same reference numerals as those of the electronic apparatus 100 described with reference to FIGS. 1 to 3. A processor may be one of the first processor 114 or the second processor 116 described in FIG. 3.

Referring to FIG. 4, in operation 401, the electronic apparatus 100 may enter a state for registering a fingerprint. For example, the state for registering the fingerprint may be a state where there is no fingerprint information of a user in the memory 118 or a state for updating the fingerprint information of the user. If the electronic apparatus 100 enters the state for registering the fingerprint, in operation 403, the processor may set the fingerprint sensing region 122c on the display 106. The processor may set a size of the fingerprint sensing region 122c to be the same as a size of the fingerprint sensor 122a, and may set the size of the fingerprint sensing region 122c to be different from a size of the fingerprint sensor 122a. According to an embodiment, the processor may display the fingerprint sensing region 122c at a location corresponding to a location, at which the fingerprint sensor 122a is disposed, on the display 106.

If the processor sets the fingerprint sensing region 122c, in operation 405, the processor may display the first guide 502 on the display 106 so as to at least partly overlap the fingerprint sensing region 122c. If the first guide 502 is displayed on the display 106, the user may touch the first guide 502 with his/her finger, in operation 407, the processor may obtain first fingerprint information through the fingerprint sensing region 122c. According to an embodiment, the processor may obtain the first fingerprint information through a first region 502a, which the fingerprint sensing region 122c occupies, in the first guide 502. The first fingerprint information may be fingerprint information obtained through the first guide 502 and may include images, minutiae, distribution of minutiae, or the like of a fingerprint.

If the first fingerprint information is obtained, in operation 409, the processor may set a region for displaying a second guide 504. For example, the processor may set the region for displaying the second guide 504 based on one or more of a location of the first guide 502, an area of the first region 502a, and the first fingerprint information. If the region for displaying the second guide 504 is set, in operation 411, the processor may display the second guide 504 such that the display 106 at least partly overlaps the fingerprint sensing region 122c.

If the second guide 504 is displayed on the display 106, the user may touch the second guide 504 with his/her finger, and, in operation 413, the processor may obtain second fingerprint information through the fingerprint sensing region 122c. According to an embodiment, the processor may obtain the second fingerprint information through a second region 504a, which the fingerprint sensing region 122c occupies, in the second guide 504.

In operation 415, the processor may determine whether the obtained fingerprint information is sufficient. For example, the processor may determine whether a fingerprint image, the region of which is not less than a preset region, is obtained. If the region of the obtained fingerprint image is not less than the preset region, the processor may store the minutiae, the distribution of minutiae, or the like of the fingerprint in the memory 118 based on the obtained fingerprint image. If the region of the obtained fingerprint image is less than the preset region, the processor may set a region for a third guide to obtain an additional image. Until the sufficient fingerprint image is obtained through operation 409 to operation 415, the processor may allow the display 106 to display guides.

Figure 5A:
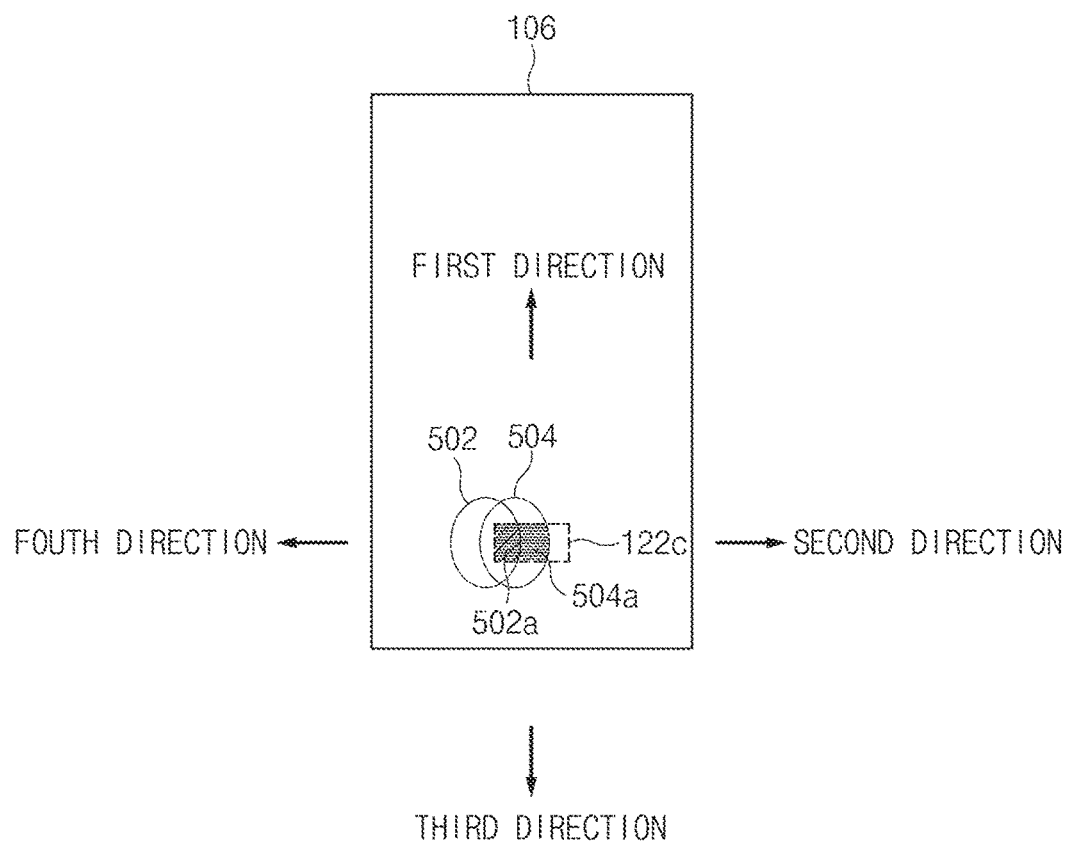
FIG. 5A illustrates a view in which a first region and a second region are at least partly overlapped, according to an embodiment of the present disclosure.
Figure 5B:
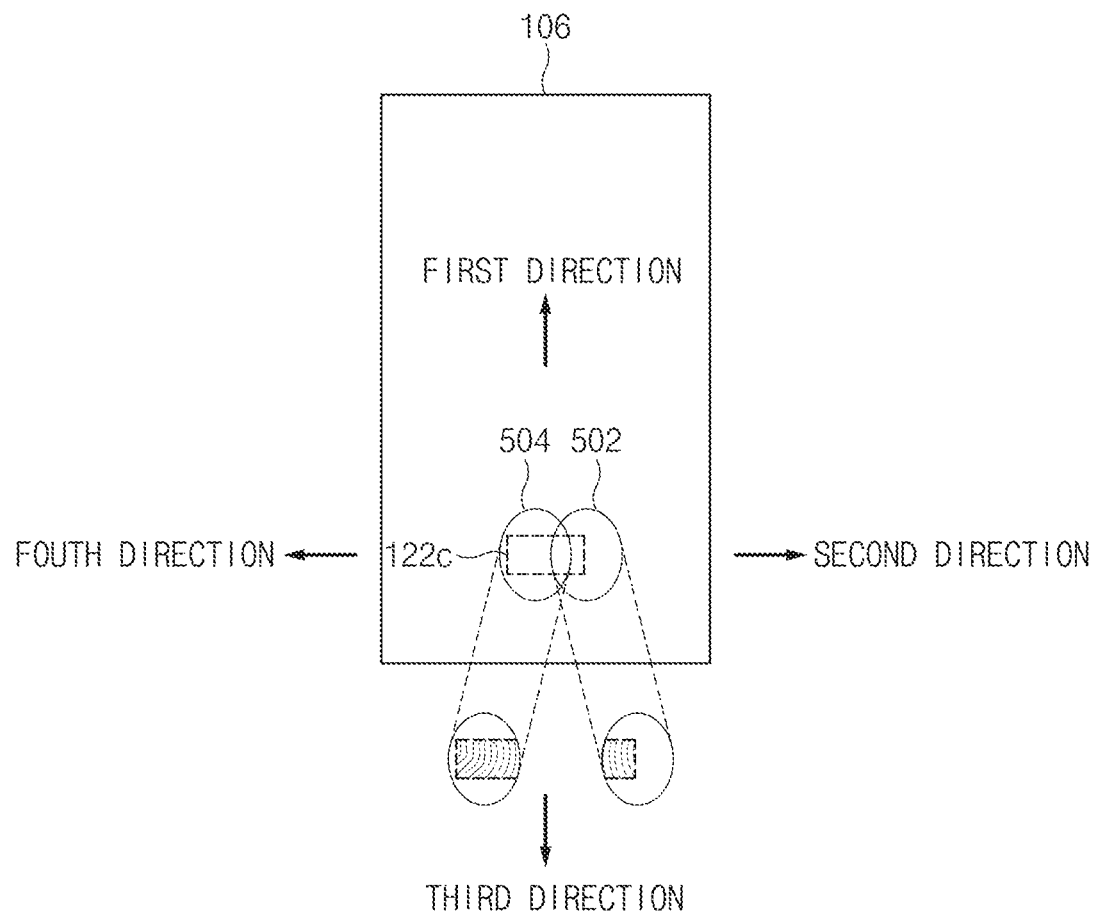
FIG. 5B illustrates a view in which a second guide is displayed on a display based on first fingerprint information, according to an embodiment of the present disclosure.
Figure 5C:
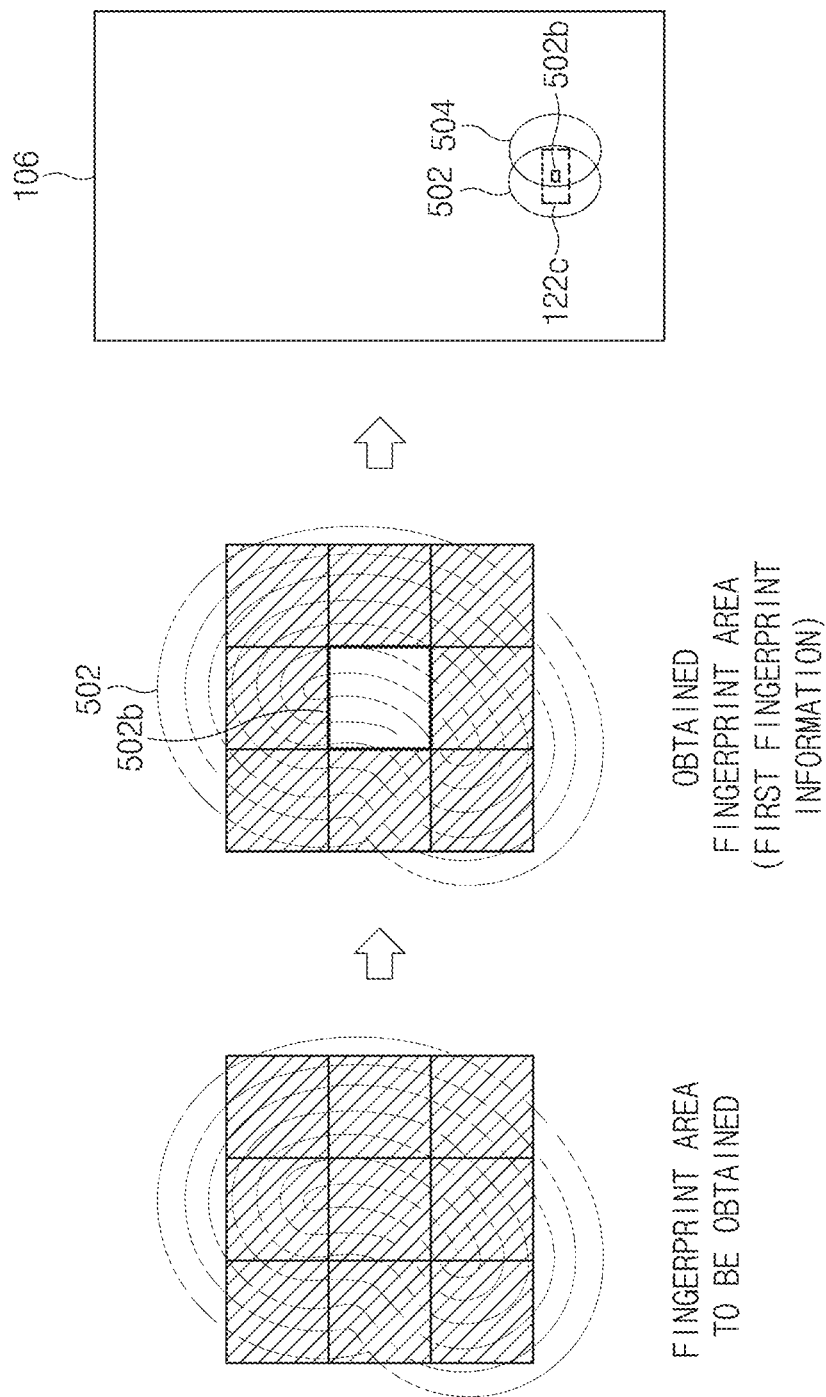
FIG. 5C illustrates a view in which a second guide is displayed on a display such that a region is missed in first fingerprint information is obtained, according to an embodiment of the present disclosure.
Figure 5D:
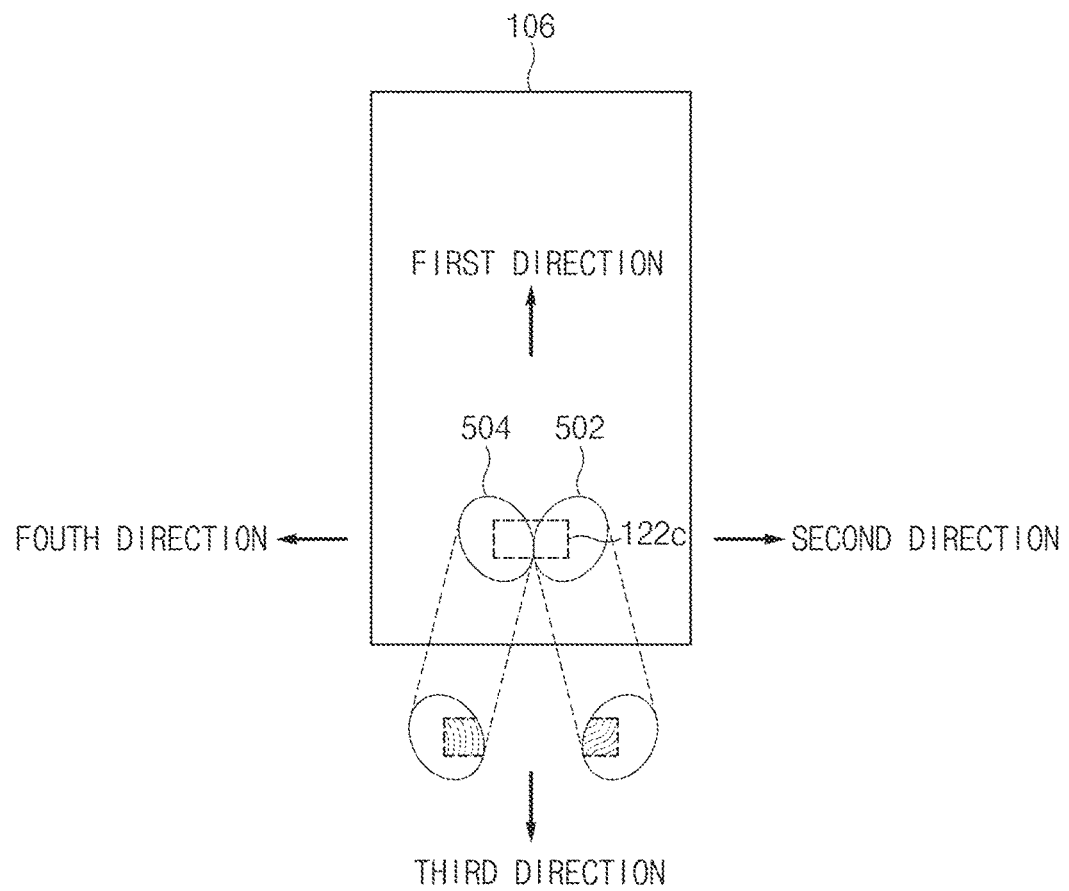
FIG. 5D illustrates a view in which a second guide is displayed on a display based on a slope of a first guide, according to an embodiment of the present disclosure.
Figure 5E:
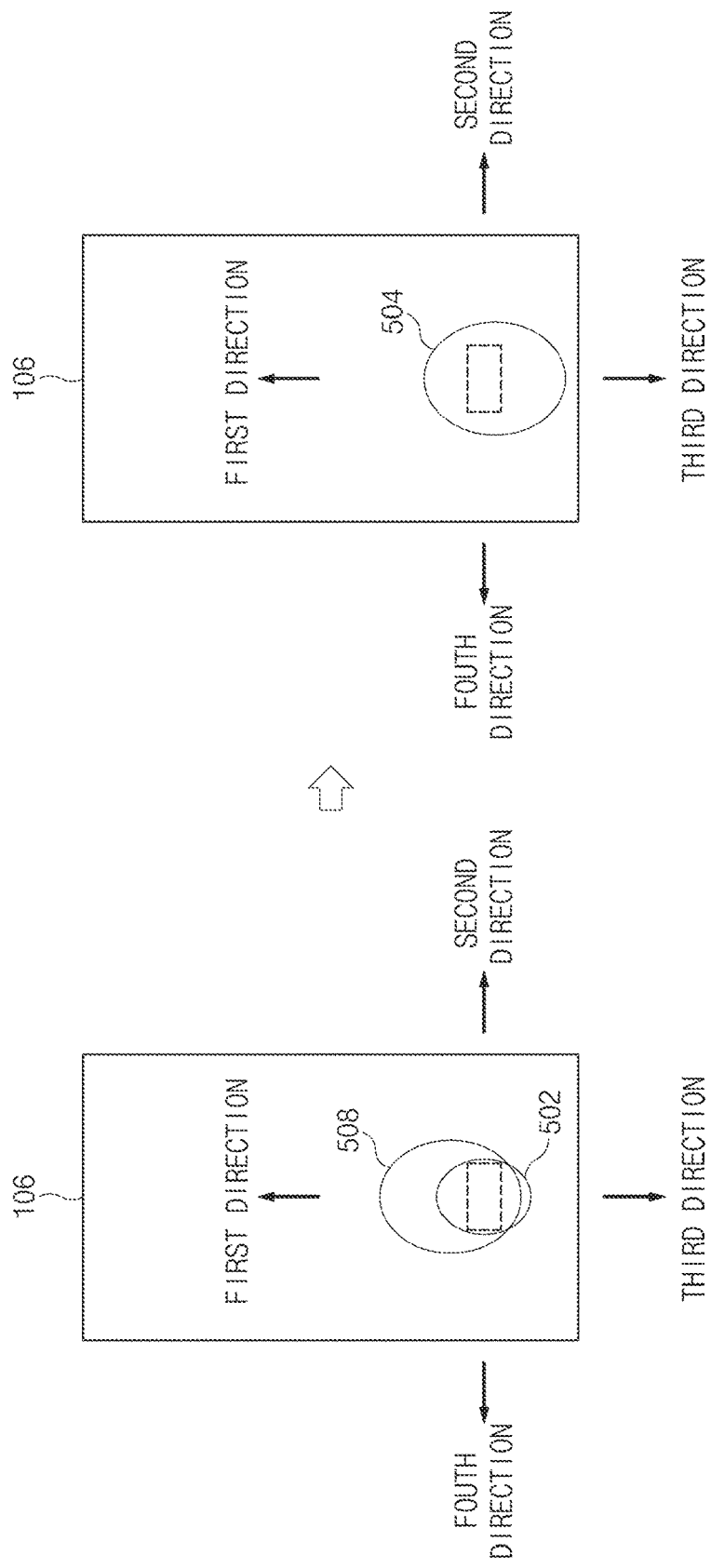
FIG. 5E illustrates a view in which a second guide is displayed on a display based on a contact region, according to an embodiment of the present disclosure.

FIG. 5A illustrates a view in which the first region 502a and the second region 504a are at least partly overlapped, according to an embodiment of the present disclosure. FIG. 5B illustrates a view in which the second guide 504 is displayed on a display 106 based on first fingerprint information, according to an embodiment of the present disclosure. FIG. 5C illustrates a view in which the second guide 504 is displayed on a display 106 such that a region missed in the first fingerprint information is obtained, according to an embodiment of the present disclosure. FIG. 5D illustrates a view in which a second guide is displayed on a display based on a slope of a first guide, according to an embodiment of the present disclosure. FIG. 5E illustrates a view in which a second guide is displayed on a display based on a contact region, according to an embodiment of the present disclosure. Embodiments illustrated in FIGS. 5A to 5E may be examples of operation 409 for setting an additional guide (e.g., the second guide 504).

Referring to FIG. 5A, the first region 502a, which the fingerprint sensing region 122c occupies, in the first guide 502 and the second region 504a, which the fingerprint sensing region 122c occupies, in the second guide 504 may be set to be at least partly overlapped with each other. A region (hereinafter referred to as an "overlapped region") in which the first region 502a overlaps the second region 504a is illustrated in FIG. 5A as being in a boundary of the fingerprint sensing region 122c. However, the overlapped region may be in the center of the fingerprint sensing region 122c. In addition, the overlapped region is illustrated in FIG. 5A as being a part of the fingerprint sensing region 122c. However, the overlapped region may include the entire fingerprint sensing region 122c. According to an embodiment of the present disclosure, second fingerprint information associated with first fingerprint information may be obtained by being set such that the first region 502a and second region 504a are at least partly overlapped with each other.

According to an embodiment, a processor may allow the display 106 to display the second guide 504 based on a location of the first guide 502. For example, if the first guide 502 is displayed in a region moving from the fingerprint sensing region 122c in a fourth direction, the second guide 504 may be displayed in a region moving from the first guide 502 in a second direction. If the first guide 502 is displayed in a region moving from the fingerprint sensing region 122c in a first direction, the second guide 504 may be displayed in a region moving from the first guide 502 in a third direction.

Returning to FIG. 5A, the first guide 502 may be displayed on the display 106, and the processor may obtain the first fingerprint information through the first guide 502. If the first fingerprint information is obtained, the first guide 502 may disappear on the display 106. If the first guide 502 disappears, the second guide 504 may be displayed on the display 106, and the processor may obtain the second fingerprint information through the second guide 504.

Unlike the above-described embodiment, the first guide 502 and the second guide 504 may be simultaneously displayed on the display 106. According to an embodiment, the processor may differentiate and display the first guide 502 and the second guide 504 by using a brightness difference between the first guide 502 and the second guide 504. For example, the first guide 502 may be displayed to be relatively bright, and the second guide 504 may be displayed to be relatively dark. If a fingerprint is recognized through the first guide 502, the processor may display the first guide 502 to be darker or may not display the first guide 502, and the processor may display the second guide 504 to be brighter. In this way, the processor may guide the user to sequentially recognize the fingerprint through an appropriate guide. The processor may differentiate the first guide 502 and the second guide 504 by displaying the first guide 502 and the second guide 504 in different shapes. The criteria for differentiating the first guide 502 and the second guide 504 is not limited to the above-described examples.

Referring to FIG. 5B, the processor may allow the display 106 to display the second guide 504 based on the first fingerprint information. For example, as illustrated in FIG. 5B, if the first guide 502 is displayed in a region moving from the fingerprint sensing region 122c in the second direction, the processor may obtain a part of a left region of a fingerprint of a finger. Accordingly, to obtain a part of a right region of the fingerprint of the finger through the second guide 504, the second guide 504 may be displayed in a region moving from the first guide 502 in the fourth direction. If the second guide 504 is displayed in a region moving from the first guide 502 in the fourth direction, the processor may obtain a part of the right region of the fingerprint of the finger as well as a part of the left region of the fingerprint of the finger.

The second guide 504 is illustrated in FIG. 5B as being displayed in a region moving from the first guide 502 in the fourth direction. However, the second guide 504 may be disposed in a region moving from the first guide 502 in the first direction, the second direction, or the third direction. For example, if the first guide 502 is displayed in a region moving from the fingerprint sensing region 122c in the first direction, the processor may obtain a part of a lower region of a fingerprint of a finger. Accordingly, to obtain a part of an upper region of the fingerprint of the finger through the second guide 504, the second guide 504 may be displayed in a region moving from the first guide 502 in the third direction.

Referring to FIG. 5C, the processor may obtain a region 502b that is missed in the first fingerprint information and may allow the display 106 to display the second guide 504 based on the region 502b. In the embodiment of FIG. 5C, the first fingerprint information may correspond to fingerprint information that is obtained up to now by a guide provided at least one or more times. For example, the processor may compare a fingerprint region to be obtained with the first fingerprint information to obtain the region 502b missed in the first fingerprint information. The fingerprint region to be obtained may be information stored in the memory 118, and the first fingerprint information may be information obtained from the first guide 502.

If the region 502b missed in the first fingerprint information is obtained, the processor may display the second guide 504 on the display 106 such that the region 502b is included. For example, the region 502b may be included in the second region 504a that the fingerprint sensing region 122c occupies in the second guide 504. According to an embodiment of the present disclosure, various fingerprint regions may be obtained by displaying a guide so as to include the missed fingerprint region.

Referring to FIG. 5D, the processor may allow the display 106 to display the second guide 504 based on a slope of the first guide 502. For example, in FIG. 5D, the first guide 502 may be tilted and displayed between the first direction and the second direction. If the first guide 502 is tilted and displayed, the processor may obtain a part of a lower left region of the fingerprint of the finger. Accordingly, to obtain a part of a lower right region of the fingerprint of the finger through the second guide 504, the processor may obliquely display the second guide 504 between the first direction and the fourth direction. If the second guide 504 is tilted and displayed between the first direction and the fourth direction, the processor may obtain a part of a lower right region of the fingerprint of the finger as well as a part of a lower left region thereof.

The slopes of the first guide 502 and the second guide 504 are not limited to the embodiment illustrated in FIG. 5D. For example, the first guide 502 and the second guide 504 may be inclined in another direction. For example, the first guide 502 may be tilted and displayed between the second direction and the third direction. If the first guide 502 is tilted and displayed between the second direction and the third direction, the processor may obtain a part of an upper left region of the fingerprint of the finger. Accordingly, to obtain a part of an upper right region of the fingerprint of the finger through the second guide 504, the processor may display the second guide 504 to be inclined between the third direction and fourth direction.

Referring to FIG. 5E, the processor may allow the display 106 to display the second guide 504 based on a touch input information. The touch input information may include a size, a location, an angle, or the like of a region 508 that the user touches in the display, and may be information obtained by a touch sensor.

In FIG. 5E, the processor may display the first guide 502 in the display. If the first guide 502 is displayed in the display, the user may touch the display with his/her finger. If the finger touches the display, the processor may display the second guide 504 in the display based on the touch input information. For example, if the size of the region 508 that the user touches in the display is greater than the size of the first guide 502, the processor may display the size of the second guide 504 in the display to be greater than the size of the first guide 502. The size of the region 508 that the user touches in the display may be proportional to the size of the finger, and may be less than the size of the first guide 502. If the size of the region 508 that the user touches in the display is less than the size of the first guide 502, the processor may display the size of the second guide 504 in the display to be less than the size of the first guide 502.

In addition, the processor may display the second guide 504 in the display based on the location of the region 508 that the user touches in the display. For example, as illustrated in FIG. 5E, the location of the region 508 that the user touches in the display may be in a region that moves from the first guide 502 in the first direction. The processor may display the second guide 504 in a region, which moves from the first guide 502 in the third direction, based on the first guide 502 and the location of the region 508 that the user touches in the display. If the second guide 504 is displayed in a region that moves from the first guide 502 in the third direction, the user may touch the center of the fingerprint sensing region 122c with his/her finger.

According to an embodiment of the present disclosure, the processor may display the second guide 504 based on the touch input information, and may display the second guide 504 based on the touch input information and the first fingerprint information. For example, as illustrated in FIG. 5E, if the finger touches a display, a part of a lower region of the fingerprint of the finger may be obtained. Moreover, in FIG. 5E, the size of the region 508 that the user touches in the display may be greater than the size of the first guide 502. Accordingly, to obtain a part of an upper region of the fingerprint such that a guide suitable for the size of the finger is displayed, the processor may display the second guide 504, the size of which is greater than the size of the first guide 502, in a region moving from the fingerprint sensing region 122c in the third direction.

In the embodiments illustrated in FIGS. 5A to 5E, a memory may store a guide of a default form, and the processor may change the guide of the default form stored in the memory and may display the changed guide in the display. For example, Referring to FIG. 5D, after displaying the guide of the default form to be inclined between the first direction and the second direction, the processor may display the guide of the default form to be inclined between the first direction and the fourth direction.

According to an embodiment of the present disclosure, the memory may store a guide list having various locations, rotation values, and the like, and the processor may display the guide based on the guide list. For example, referring to FIG. 5B, after displaying the first guide 502, the processor may select and display the second guide 504 of guides included in the guide list to obtain a part of a right region of the fingerprint of the finger.

Figure 6A:
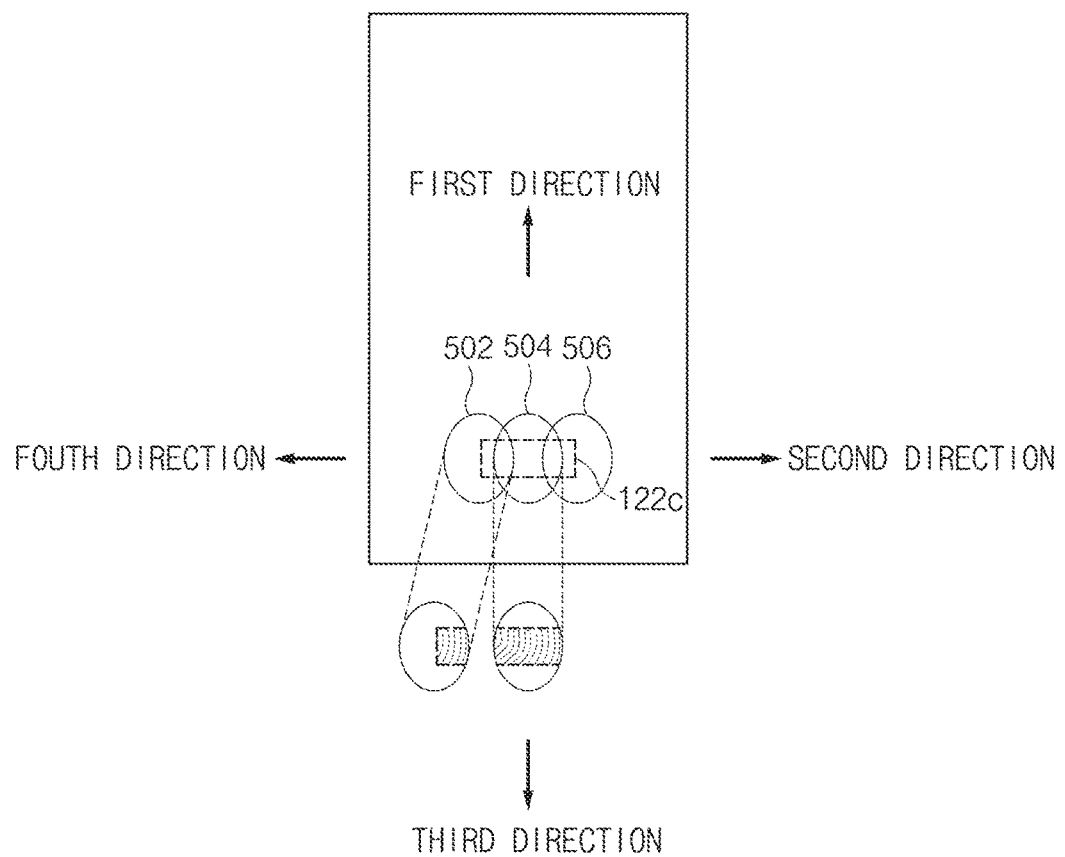
FIG. 6A illustrates a fingerprint sensing region of a rectangular shape and first to third guides displayed on a fingerprint sensing region, according to an embodiment of the present disclosure.
Figure 6B:
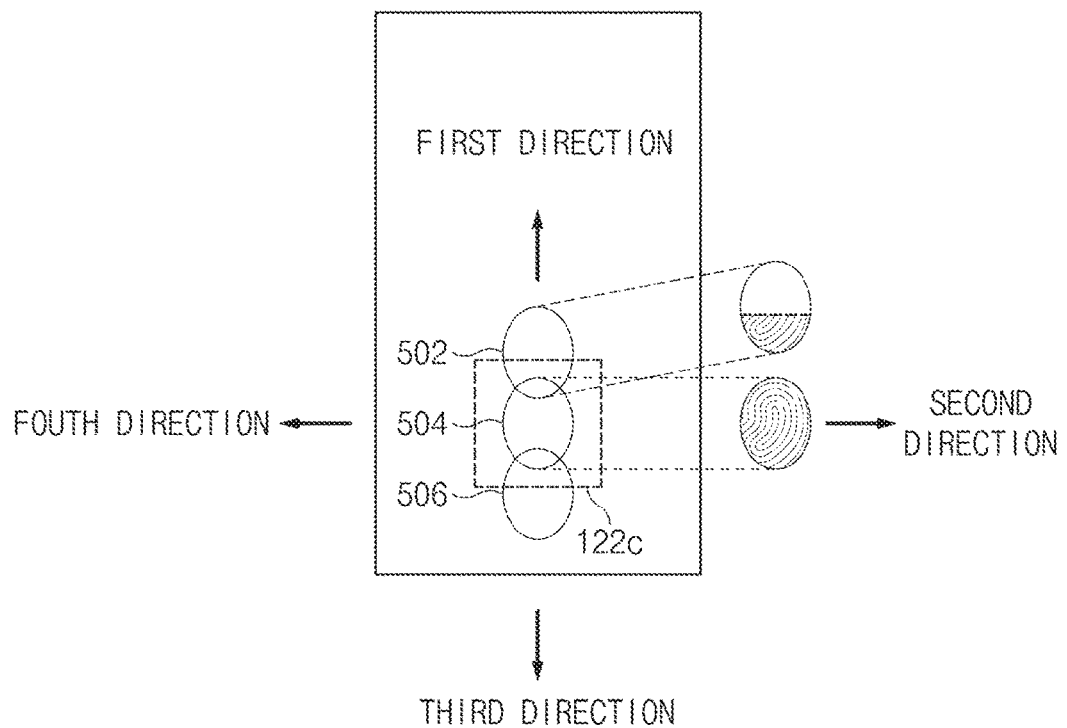
FIG. 6B illustrates a four-square fingerprint sensing region and first to third guides displayed on a fingerprint sensing region, according to an embodiment of the present disclosure.
Figure 6C:
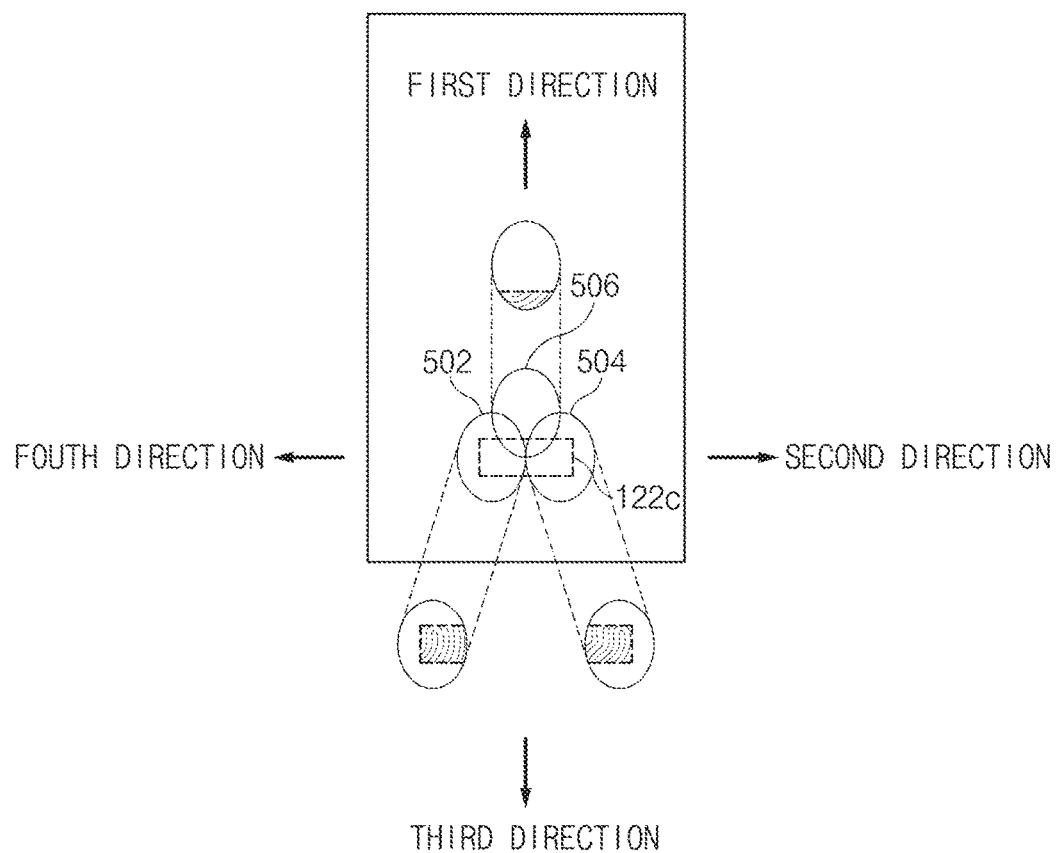
FIG. 6C illustrates a third guide displayed on a display such that fingerprint information that is not included in first fingerprint information and second fingerprint information is obtained according to an embodiment of the present disclosure.

FIG. 6A illustrates a fingerprint sensing region 122c of a rectangular shape and first to third guides 502, 504, and 506 displayed on the fingerprint sensing region 122c, according to an embodiment of the present disclosure. FIG. 6B illustrates a four-square fingerprint sensing region 122c and first to third guides 502, 504, and 506 displayed on the fingerprint sensing region 122c, according to an embodiment of the present disclosure. FIG. 6C illustrates a third guide displayed on a display such that fingerprint information that is not included in first fingerprint information and second fingerprint information is obtained. Embodiments illustrated in FIGS. 6A to 6C may be examples of operation 409 for setting an additional guide (e.g., the third guide 506).

Referring to FIG. 6A and 6B, a processor may allow the display 106 to display a third guide 506 based on a size of the fingerprint sensor 122a or a shape of the fingerprint sensor 122a. Since the fingerprint sensor 122a is a rectangular form in FIG. 6A, the processor may allow the display 106 to sequentially display the first to third guides 502, 504, and 506 in a region aligned in a second direction on the fingerprint sensing region 122c. The first to third guides 502, 504, and 506 are illustrated in FIG. 6A as being sequentially displayed in the order of the first to third guides 502, 504, and 506 in the region aligned in the second direction on the fingerprint sensing region 122c. However, the first to third guides 502, 504, and 506 may be sequentially displayed in a region aligned in a fourth direction on the fingerprint sensing region 122c.

Referring to FIG. 6B, the first guide 502 to third guide 506 may be sequentially displayed in a region aligned in a third direction on the fingerprint sensing region 122c. Since the fingerprint sensor 122a is the rectangular form in FIG. 6B, the first to third guides 502, 504, and 506 may be sequentially displayed in a region aligned in the first direction, the second direction, or the fourth direction on the fingerprint sensing region 122c. In addition, if the sufficient fingerprint information is obtained because the fingerprint sensor 122a is the rectangular form and the first guide 502 is displayed in the center region of the fingerprint sensing region 122c, the second guide 504 and the third guide 506 may not be displayed.

According to an embodiment, the processor may make it possible to display the third guide 506 based on how much the first fingerprint information is the same as the second fingerprint information. Returning to FIG. 6A, a part in which the first fingerprint information is the same as the second fingerprint information may be a part of a right region of a fingerprint of a finger. Accordingly, to obtain a part of a left region of the fingerprint of the finger, the processor may allow the display 106 to display the third guide 506 in a region moving from the fingerprint sensing region 122c in a second direction.

Referring to FIG. 6B, the part in which the first fingerprint information is the same as the second fingerprint information may be a part of a lower region of the fingerprint of the finger. Accordingly, to obtain a part of an upper region of the fingerprint of the finger, the processor may allow the display 106 to display the third guide 506 in a region moving from the fingerprint sensing region 122c in a third direction.

Referring to FIG. 6C, the processor may display the third guide 506 in the display such that fingerprint information that is not included in the first fingerprint information and the second fingerprint information is obtained. For example, as illustrated in FIG. 6C, the processor may obtain a part of a right region of the fingerprint of the finger through the first guide 502, and may obtain a part of a left region of the fingerprint of the finger through the second guide 504. Accordingly, to obtain fingerprint information that is not included in the first fingerprint information and the second fingerprint information, the processor may display the third guide 506 in a region moving from the fingerprint sensing region 122c in a first direction. If the third guide 506 is displayed, the processor may obtain a part of a lower region of the fingerprint of the finger through the third guide 506.

The third guide 506 is illustrated in FIG. 6C as being displayed in the region moving in the first direction of a fingerprint sensing region. However, the third guide 506 may be displayed in a region in the third direction. If the third guide 506 is displayed in the third direction, the processor may obtain a part of an upper region of the fingerprint of the finger. According to an embodiment of the present disclosure, the processor may obtain the entire fingerprint of the finger by displaying the third guide 506 such that the fingerprint information that is not included in the first fingerprint information and the second fingerprint information is obtained.

Figure 7:
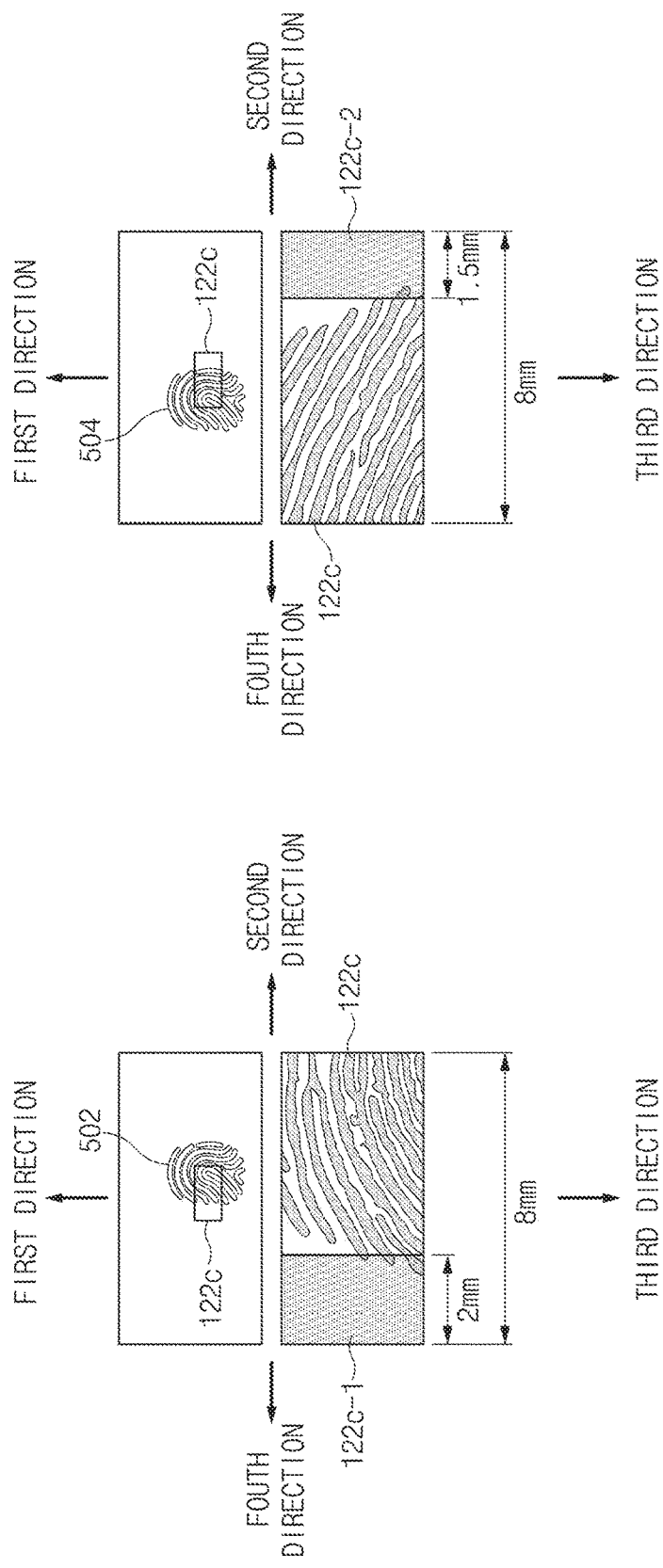
FIG. 7 illustrates a first non-overlapped region and a second non-overlapped region, according to an embodiment of the present disclosure.

FIG. 7 illustrates a first non-overlapped region 122c-1 and a second non-overlapped region 122c-2, according to an embodiment of the present disclosure.

Referring to FIG. 7, a processor may obtain the first non-overlapped region 122c-1 and the second non-overlapped region 122c-2. The first non-overlapped region 122c-1 may be the remaining region other than a region, in which the fingerprint sensing region 122c overlaps the first guide 502, in the fingerprint sensing region 122c. The second non-overlapped region 122c-2 may be the remaining region other than a region, in which the fingerprint sensing region 122c overlaps the second guide 504, in the fingerprint sensing region 122c.

If the first non-overlapped region 122c-1 and the second non-overlapped region 122c-2 are obtained, the processor may obtain the length of the fingerprint based on the first non-overlapped region 122c-1 and the second non-overlapped region 122c-2. For example, the processor may allow the display 106 to display the first guide 502 in a region moving from the fingerprint sensing region 122c in a second direction. If the first guide 502 is displayed in the region moving from the fingerprint sensing region 122c in the second direction, the processor may obtain a left fingerprint region of a finger, and the first non-overlapped region 122c-1 may be formed in a region moving from a center of the fingerprint sensing region 122c in a fourth direction. Unlike the first guide 502, the processor may allow the display 106 to display the second guide 504 in the region moving from the fingerprint sensing region 122c in the fourth direction. If the display 106 displays the second guide 504 in the region moving from the fingerprint sensing region 122c in the fourth direction, the processor may obtain a right fingerprint region of the fingerprint of the finger, and the second non-overlapped region 122c-2 may be formed in a region moving from a center of the fingerprint sensing region 122c in the second direction.

If the first non-overlapped region 122c-1 and the second non-overlapped region 122c-2 are formed on the fingerprint sensing region 122c, the processor may obtain a length of the fingerprint based on a length of the first non-overlapped region 122c-1 and a length of the second non-overlapped region 122c-2. For example, in FIG. 7, the length of the fingerprint sensing region 122c may be 8 mm, the length of the first non-overlapped region 122c-1 may be 2 mm, and the length of the second non-overlapped region 122c-2 may be 1.5 mm Since the length of the fingerprint sensing region 122c is 8 mm and the length of the first non-overlapped region 122c-1 is 2 mm, the length of the left fingerprint region of the finger may be 6 mm (8 mm−2 mm=6 mm) Since the length of the fingerprint sensing region 122c is 8 mm and the length of the second non-overlapped region 122c-2 is 1.5 mm, the length of the right fingerprint region of the finger may be 6.5 mm (8 mm−1.5 mm=6.5 mm) Accordingly, a width of the fingerprint may be 12.5 mm that is a sum of the length of the left fingerprint region and the length of the right fingerprint region.

In FIG. 7, an embodiment obtaining the width of the fingerprint is illustrated. However, the height of the fingerprint may be obtained by using the embodiment illustrated in FIG. 7. In addition, an area of the fingerprint may be obtained by using the width and the height of the fingerprint.

Figure 8:
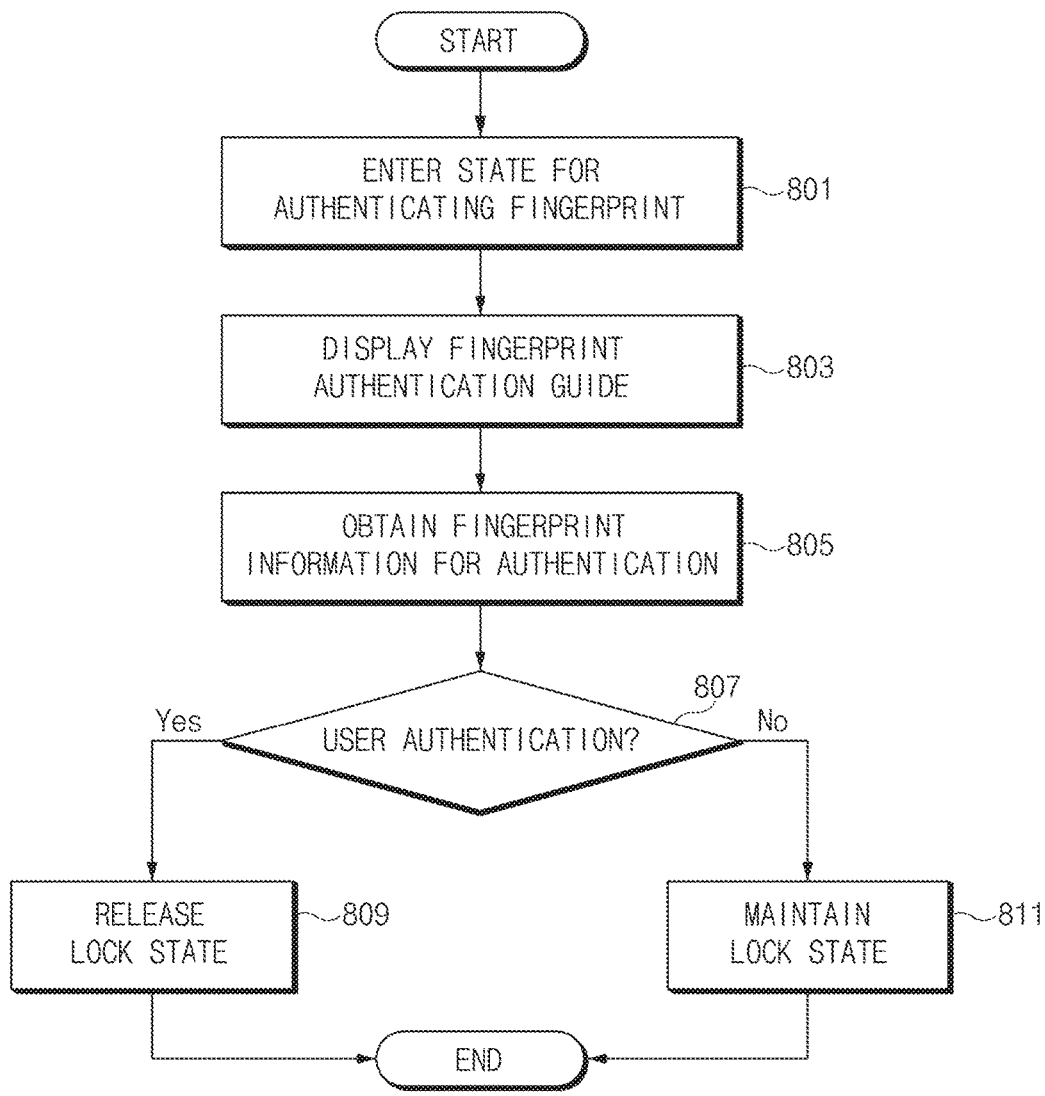
FIG. 8 is a flowchart for describing release of a lock state of an electronic apparatus, according to an embodiment of the present disclosure.
Figure 9:
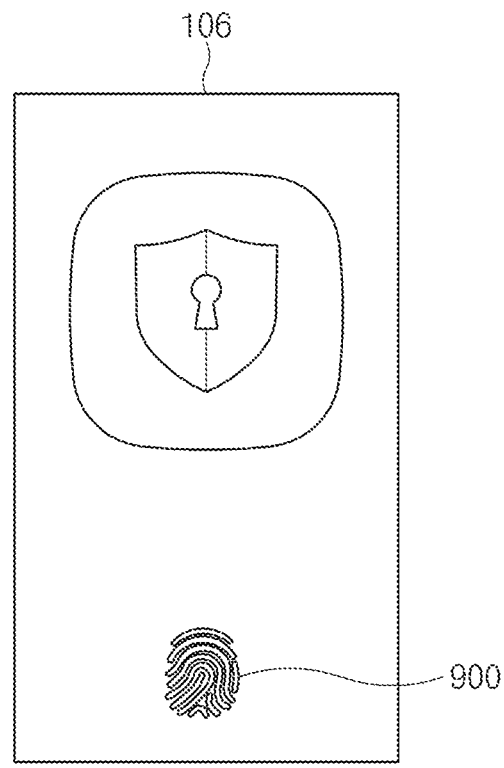
FIG. 9 illustrates a display in which a fingerprint authentication guide is displayed, according to an embodiment of the present disclosure.

FIG. 8 is a flowchart for describing release of a lock state of an electronic apparatus, according to an embodiment of the present disclosure. FIG. 9 illustrates the display 106 in which a fingerprint authentication guide 900 is displayed, according to an embodiment of the present disclosure.

Referring to FIGS. 8 and 9, in operation 801, the electronic apparatus 100 may enter a state for authenticating a fingerprint. For example, the state for authenticating the fingerprint may be a state where a display recognizes the fingerprint in the lock state to release the lock state.

If the electronic apparatus 100 enters a state for authenticating the fingerprint, in operation 803, the processor may allow the display 106 to display a fingerprint authentication guide 900. The fingerprint authentication guide 900 is illustrated in FIG. 9 as being displayed on the display 106 to release a screen lock state. However, the fingerprint authentication guide 900 may be displayed on the display 106 when a financial transaction or the like is made.

If the fingerprint authentication guide 900 is displayed on the display 106, in operation 805, the processor may obtain the fingerprint information for authentication. In operation 807, the processor may perform user authentication. For example, the processor may compare the fingerprint information registered through a process of FIG. 4 with the obtained fingerprint information. If the obtained fingerprint information corresponds to the fingerprint information registered in advance, in operation 809, the processor may release a lock state. Otherwise, the processor may maintain the lock state in operation 811.

Figure 10:
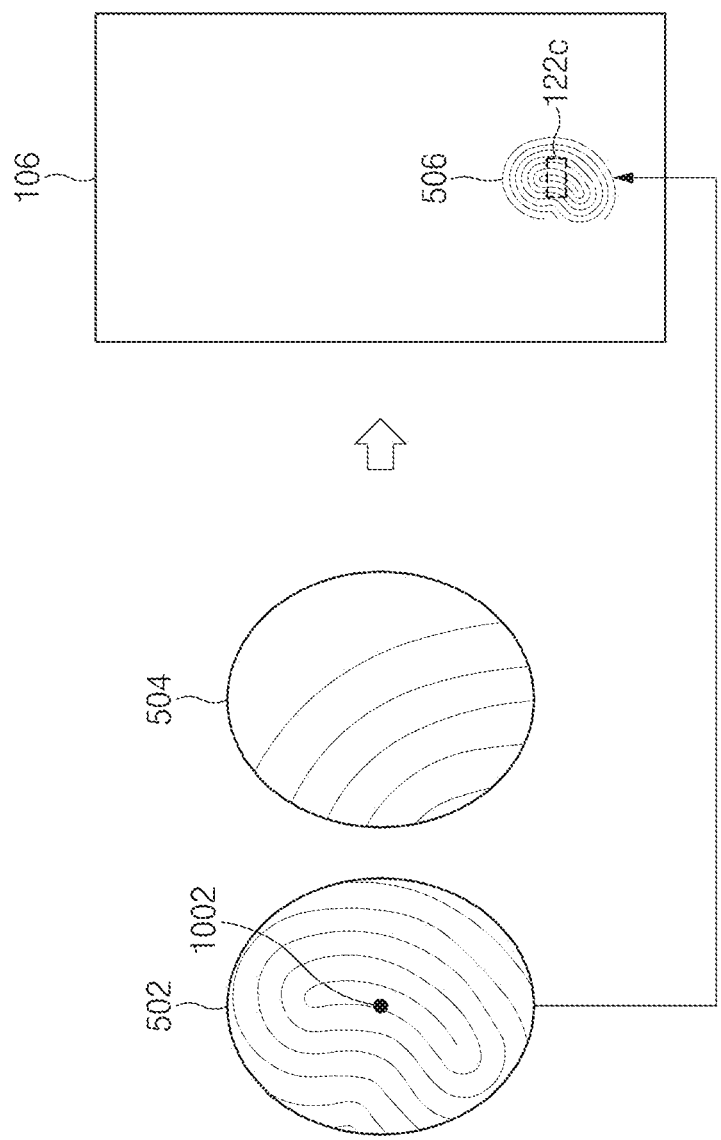
FIG. 10 illustrates a view in which fingerprint information including preset minutiae is displayed, and in which a fingerprint authentication guide is displayed at a location of a guide obtaining the fingerprint information according to an embedment of the present disclosure.

FIG. 10 illustrates a view in which fingerprint information including preset minutiae is displayed, and in which the fingerprint authentication guide 900 is displayed at a location of a guide obtaining the fingerprint information according to an embodiment of the present disclosure. An embodiment illustrated in FIG. 10 may be an example of operation 803 described in FIG. 8.

Referring to FIG. 10, the processor may obtain fingerprint information, which includes preset minutiae 1002, of first fingerprint information and second fingerprint information.

For example, the preset minutiae 1002 may be minutiae that are at the center of the fingerprint. As illustrated in FIG. 10, the first fingerprint information obtained through the first guide 502 may include the minutiae 1002 that is at the center of the fingerprint. On the other hand, the second fingerprint information obtained through the second guide 504 may not include the minutiae 1002 that is at the center of the fingerprint. Accordingly, in FIG. 10, the fingerprint information including the preset minutiae 1002 may be the first fingerprint information.

If the fingerprint information including the preset minutiae 1002 is obtained, the processor may obtain a location at which a guide obtaining the fingerprint information is displayed on the display 106. If the location is obtained, the processor may allow the display 106 to display the fingerprint authentication guide 900 at the location. In an example of FIG. 10, since the fingerprint information including the preset minutiae 1002 is the first fingerprint information, the processor may allow the display 106 to display the fingerprint authentication guide 900 at a location at which the first guide 502 is displayed.

Unlike the embodiment illustrated in FIG. 10, the fingerprint authentication guide 900 may be displayed at the location of the guide where the fingerprint information, the number of minutiae of which is great, is obtained. Furthermore, the fingerprint authentication guide 900 may be displayed at the location of the guide where the fingerprint information, the distribution of minutiae of which is wide, is obtained. Moreover, the fingerprint authentication guide 900 may be displayed at the location of the guide where the fingerprint information including a middle region of the fingerprint is obtained. According to an embodiment of the present disclosure, a fingerprint recognition rate may increase by displaying the guide based on the fingerprint information.

Figure 11:
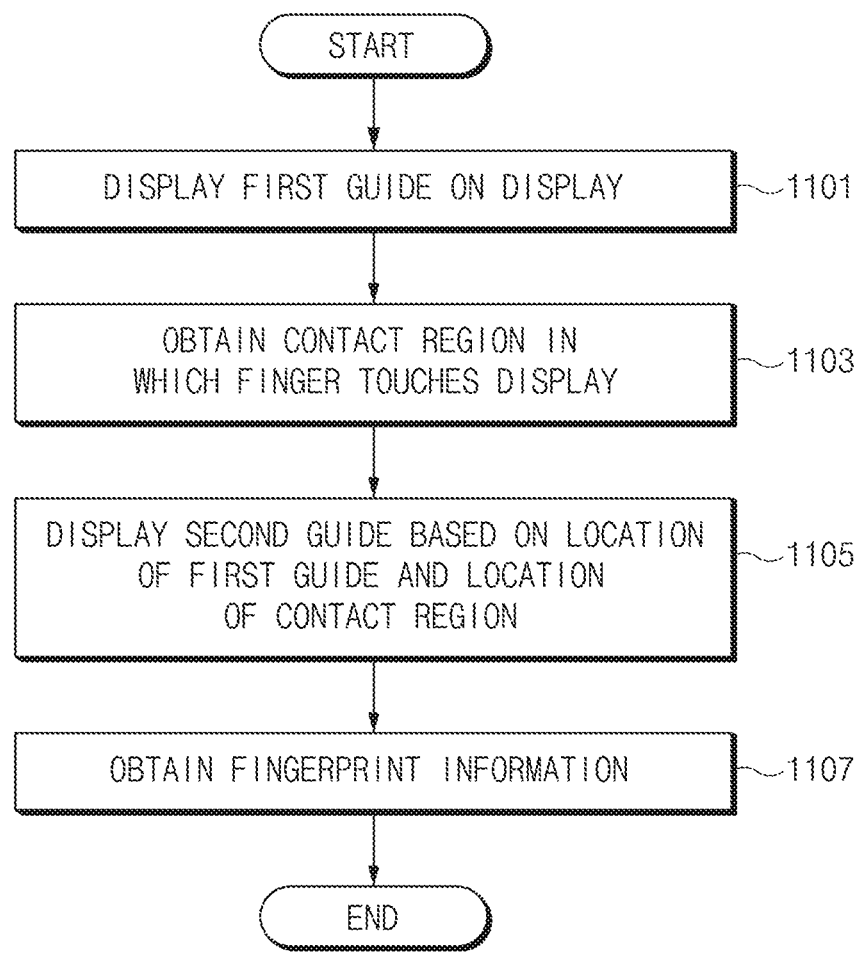
FIG. 11 is a flowchart for describing that a second guide is displayed on a display in the case where a finger touches a location different from the first guide, according to an embodiment of the present disclosure.
Figure 12:
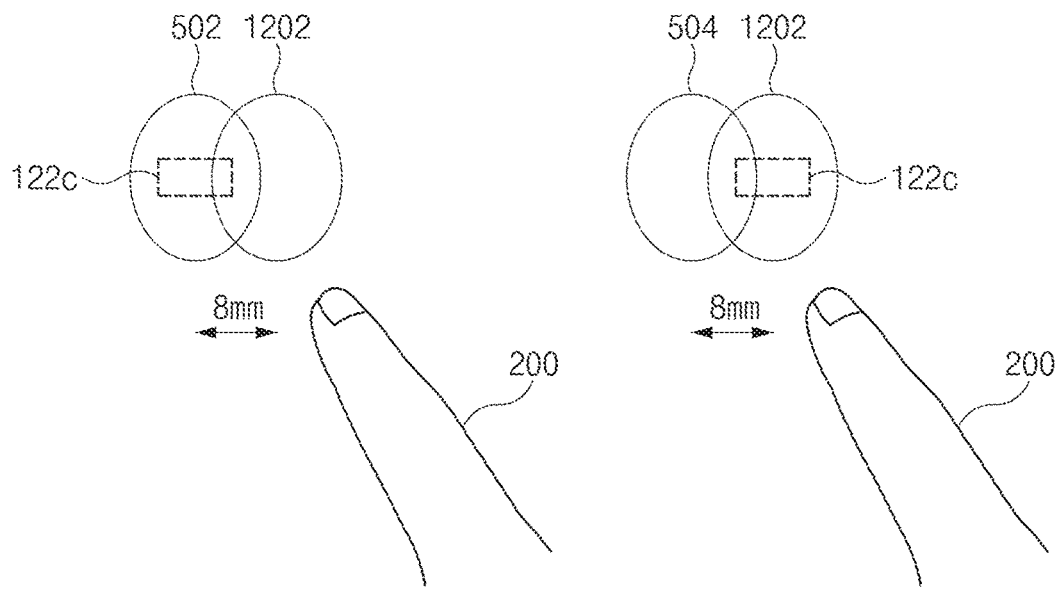
FIG. 12 is a view which guides a finger to touch a center of a fingerprint sensing region by displaying a second guide at a location different from a first guide, according to an embodiment of the present disclosure.

FIG. 11 is a flowchart for describing that the second guide 504 is displayed on the display 106 in the case where a finger touches a location different from the first guide 502, according to an embodiment of the present disclosure. FIG. 12 is a view which guides a finger to touch a center of the fingerprint sensing region 122c by displaying the second guide 504 at a location different from the first guide 502, according to an embodiment of the present disclosure.

Referring to FIG. 11, in operation 1101, a processor may set the fingerprint sensing region 122c on the display 106, and may display the first guide 502 such that the display 106 at least partly overlaps the fingerprint sensing region 122c. If the finger touches the display 106, in operation 1103, the processor may obtain a contact region 1202 in which the finger touches the display 106. The contact region 1202 may at least partly overlap the first guide 502, or there may be no region in which the contact region 1202 overlaps the first guide 502.

In operation 1105, the processor may allow the display 106 to display the second guide 504 based on a location of the first guide 502 and a location of the contact region 1202. For example, the processor may obtain a spaced distance between the first guide 502 and the contact region 1202. The spaced distance may be a distance from a center of the first guide 502 to a center of the contact region 1202. If the spaced distance is obtained, after moving the second guide 504 from the center of the fingerprint sensing region 122c by the spaced distance, the processor may display the second guide 504 on the display 106. If the second guide 504 is displayed on the display 106, in operation 1107, the processor may obtain fingerprint information by using the second guide 504.

Referring to FIG. 12, a user may touch a location, which is different from a location where the first guide 502 is displayed, with his/her finger 200. In FIG. 12, the user may touch a location, which moves from the first guide 502 in a right direction by 8 mm, with the finger 200. The location that the finger 200 touches may vary depending on a method in which the user grips the electronic apparatus 100, a form of his/her hand, or the like.

If the spaced distance (e.g., 8 mm) between the first guide 502 and the contact region 1202 is obtained, after moving the second guide 504 from the center of the fingerprint sensing region 122c by 8 mm, the processor may output the second guide 504 on the display 106. If the second guide 504 is displayed after moving the second guide 504 from the center of the fingerprint sensing region 122c by 8 mm, the contact region 1202 may be formed in the center of the fingerprint sensing region 122c. According to an embodiment of the present disclosure, a fingerprint recognition rate may increase by displaying a guide based on habits of the user, or the like.

The embodiment illustrated in FIGS. 11 to 12 may be applied to both an embodiment registering a fingerprint and an embodiment authenticating the fingerprint. Referring to FIG. 12, in a process of registering a fingerprint, the user may touch a location different from a location of the first guide 502 with the finger 200. If the user touches a location different from a location of the first guide 502 with the finger 200, the processor may not obtain the fingerprint information. Accordingly, the processor may obtain the spaced distance between the first guide 502 and the contact region 1202. After moving the second guide 504 from the center of the fingerprint sensing region 122c by the spaced distance, the processor may display the second guide 504. If the second guide 504 is displayed after being spaced apart from the center of the fingerprint sensing region 122c, the user may touch the center of the fingerprint sensing region 122c with the finger 200. The processor may obtain the second fingerprint information and may store the second fingerprint information in the memory 118.

Unlike the above-described example, in a process of authenticating a fingerprint, the user may touch a location different from a location of a guide with the finger 200. If the user touches a location different from the location of the guide with the finger 200, fingerprint authentication is impossible. Accordingly, the processor may display the second guide 504 on the display 106 by applying the spaced distance, which is obtained in the process of registering the fingerprint, between the first guide 502 and the contact region 1202. If the second guide 504 is displayed after being spaced apart from the center of the fingerprint sensing region 122c, the user may touch the center of the fingerprint sensing region 122c with the finger 200. The processor may obtain the second fingerprint information and may compare the first fingerprint information with the second fingerprint information. If the first fingerprint information is the same as the second fingerprint information, the processor may release a lock state.

The directions (e.g., first, second, third, and fourth directions) described in FIGS. 1 to 5A to 5E, 6A to 6C, and 7 to 12 may be provided as four directions for convenience of description. However, the directions may be certain directions on a display with respect to a location of a fingerprint sensing region.

Figure 13:
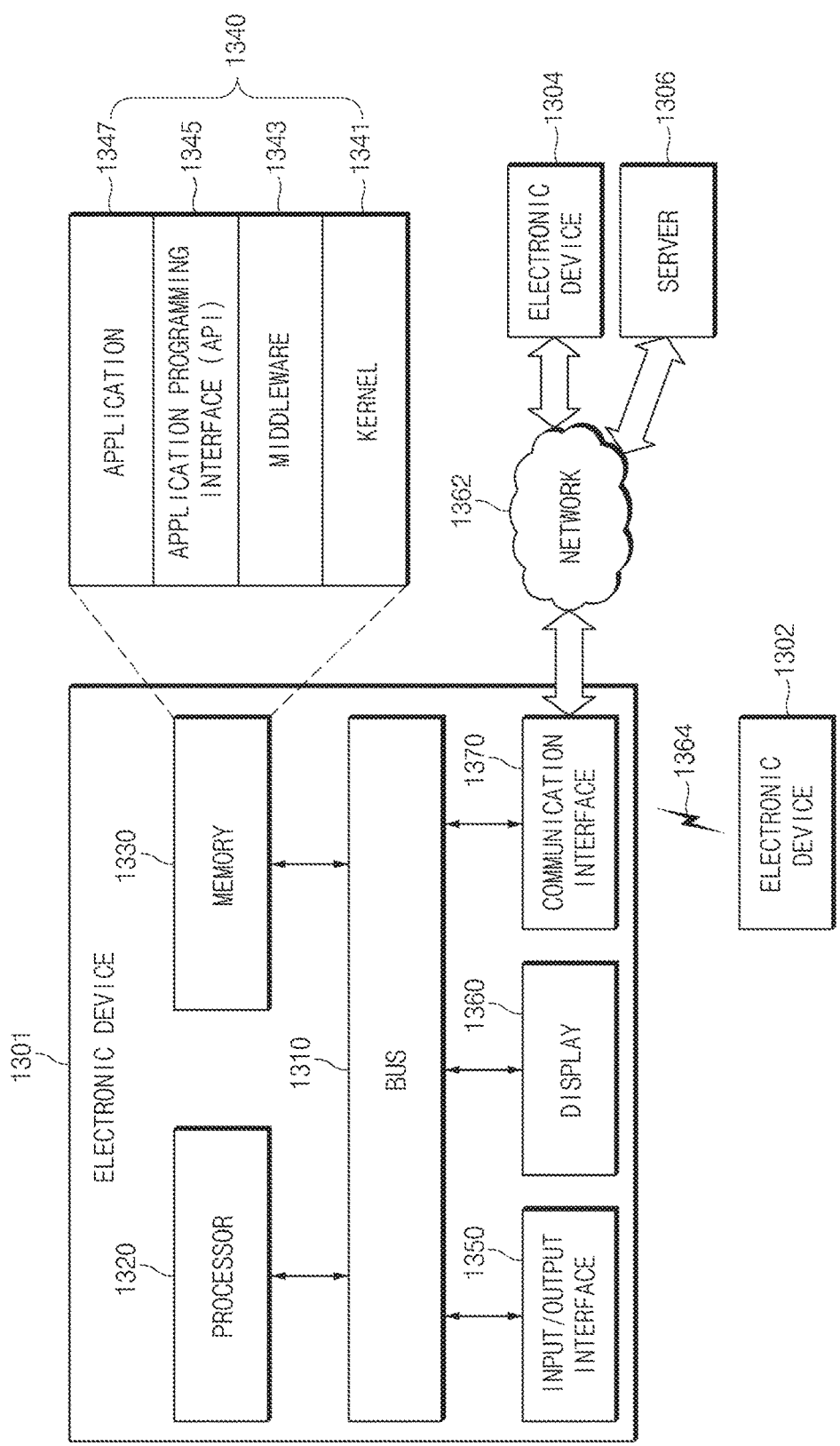
FIG. 13 illustrates an electronic apparatus in a network environment, according to an embodiment of the present disclosure.

FIG. 13 illustrates an electronic device in a network environment system, according to an embodiment of the present disclosure.

Referring to FIG. 13, according to an embodiment, an electronic device 1301, a first electronic device 1302, a second electronic device 1304, or a server 1306 may be connected each other over a network 1362 or a short range communication 1364. The electronic device 1301 may include a bus 1310, a processor 1320, a memory 1330, an input/output interface 1350, a display 1360, and a communication interface 1370. According to an embodiment, the electronic device 1301 may not include at least one of the above-described elements or may further include other element(s).

For example, the bus 1310 may interconnect the above-described elements 1310 to 1370 and may include a circuit for conveying communications (e.g., a control message and/or data) among the above-described elements.

The processor 1320 may include one or more of a CPU, an AP, or a CP. For example, the processor 1320 may perform an arithmetic operation or data processing associated with control and/or communication of at least other elements of the electronic device 1301.

The memory 1330 may include a volatile and/or nonvolatile memory. For example, the memory 1330 may store instructions or data associated with at least one other element(s) of the electronic device 1301. According to an embodiment, the memory 1330 may store software and/or a program 1340. The program 1340 may include, for example, a kernel 1341, a middleware 1343, an application programming interface (API) 1345, and/or an application program (or "an application") 1347. At least a part of the kernel 1341, the middleware 1343, or the API 1345 may be referred to as an "operating system (OS)".

For example, the kernel 1341 may control or manage system resources (e.g., the bus 1310, the processor 1320, the memory 1330, and the like) that are used to execute operations or functions of other programs (e.g., the middleware 1343, the API 1345, and the application program 1347). Furthermore, the kernel 1341 may provide an interface that allows the middleware 1343, the API 1345, or the application program 1347 to access discrete elements of the electronic device 1301 so as to control or manage system resources.

The middleware 1343 may perform, for example, a mediation role such that the API 1345 or the application program 1347 communicates with the kernel 1341 to exchange data.

Furthermore, the middleware 1343 may process task requests received from the application program 1347 according to a priority. For example, the middleware 1343 may assign the priority, which makes it possible to use a system resource (e.g., the bus 1310, the processor 1320, the memory 1330, or the like) of the electronic device 1301, to at least one of the application program 1347. For example, the middleware 1343 may process the one or more task requests according to the priority assigned to the at least one, which makes it possible to perform scheduling or load balancing on the one or more task requests.

The API 1345 may be, for example, an interface through which the application program 1347 controls a function provided by the kernel 1341 or the middleware 1343, and may include, for example, at least one interface or function (e.g., an instruction) for a file control, a window control, image processing, a character control, or the like.

The input/output interface 1350 may play a role, for example, of an interface which transmits an instruction or data input from a user or another external device, to other element(s) of the electronic device 1301. Furthermore, the input/output interface 1350 may output an instruction or data, received from other element(s) of the electronic device 1301, to a user or another external device.

The display 1360 may include, for example, a liquid crystal display (LCD), a light-emitting diode (LED) display, an organic LED (OLED) display, a microelectromechanical systems (MEMS) display, or an electronic paper display. The display 1360 may display, for example, various contents (e.g., a text, an image, a video, an icon, a symbol, and the like) to a user. The display 1360 may include a touch screen and may receive, for example, a touch, gesture, proximity, or hovering input using an electronic pen or a part of a user's body.

For example, the communication interface 1370 may establish communication between the electronic device 1301 and an external device (e.g., the first electronic device 1302, the second electronic device 1304, or the server 1306). For example, the communication interface 1370 may be connected to the network 1362 over wireless communication or wired communication to communicate with the external device (e.g., the second electronic device 1304 or the server 1306).

The wireless communication may use at least one of, for example, long-term evolution (LTE), LTE Advanced (LTE-A), code division multiple access (CDMA), Wideband CDMA (WCDMA), universal mobile telecommunications system (UMTS), wireless broadband (WiBro), global system for mobile communications (GSM), or the like, as cellular communication protocol. Furthermore, the wireless communication may include, for example, the short range communication 1364. The short range communication 1364 may include at least one of wireless fidelity (Wi-Fi), Bluetooth (BT), near field communication (NFC), magnetic stripe transmission (MST), a global navigation satellite system (GNSS), or the like.

The MST may generate a pulse in response to transmission data using an electromagnetic signal, and the pulse may generate a magnetic field signal. The electronic device 1301 may transfer the magnetic field signal to point of sale (POS), and the POS may detect the magnetic field signal using a MST reader. The POS may recover the data by converting the detected magnetic field signal to an electrical signal.

The GNSS may include at least one of, for example, a global positioning system (GPS), a global navigation satellite system (Glonass), a Beidou navigation satellite system (hereinafter referred to as "Beidou"), or an European global satellite-based navigation system (hereinafter referred to as "Galileo") based on an available region, a bandwidth, or the like. Hereinafter, in this disclosure, "GPS" and "GNSS" may be interchangeably used. The wired communication may include at least one of, for example, a universal serial bus (USB), a high definition multimedia interface (HDMI), a recommended standard-232 (RS-232), a plain old telephone service (POTS), or the like. The network 1362 may include at least one of telecommunications networks, for example, a computer network (e.g., local access network (LAN) or wide access network (WAN)), an Internet, or a telephone network.

Each of the first and second electronic devices 1302 and 1304 may be a device of which the type is different from or the same as that of the electronic device 1301. According to an embodiment, the server 1306 may include a group of one or more servers. According to an embodiment, all or a portion of operations that the electronic device 1301 will perform may be executed by another or plural electronic devices (e.g., the first electronic device 1302, the second electronic device 1304 or the server 1306). According to an embodiment, in the case where the electronic device 1301 executes any function or service automatically or in response to a request, the electronic device 1301 may not perform the function or the service internally, but, alternatively additionally, it may request at least a portion of a function associated with the electronic device 1301 from another device (e.g., the electronic device 1302 or 1304 or the server 1306). The other electronic device may execute the requested function or additional function and may transmit the execution result to the electronic device 1301. The electronic device 1301 may provide the requested function or service using the received result or may additionally process the received result to provide the requested function or service. To this end, for example, cloud computing, distributed computing, or client-server computing may be used.

Figure 14:
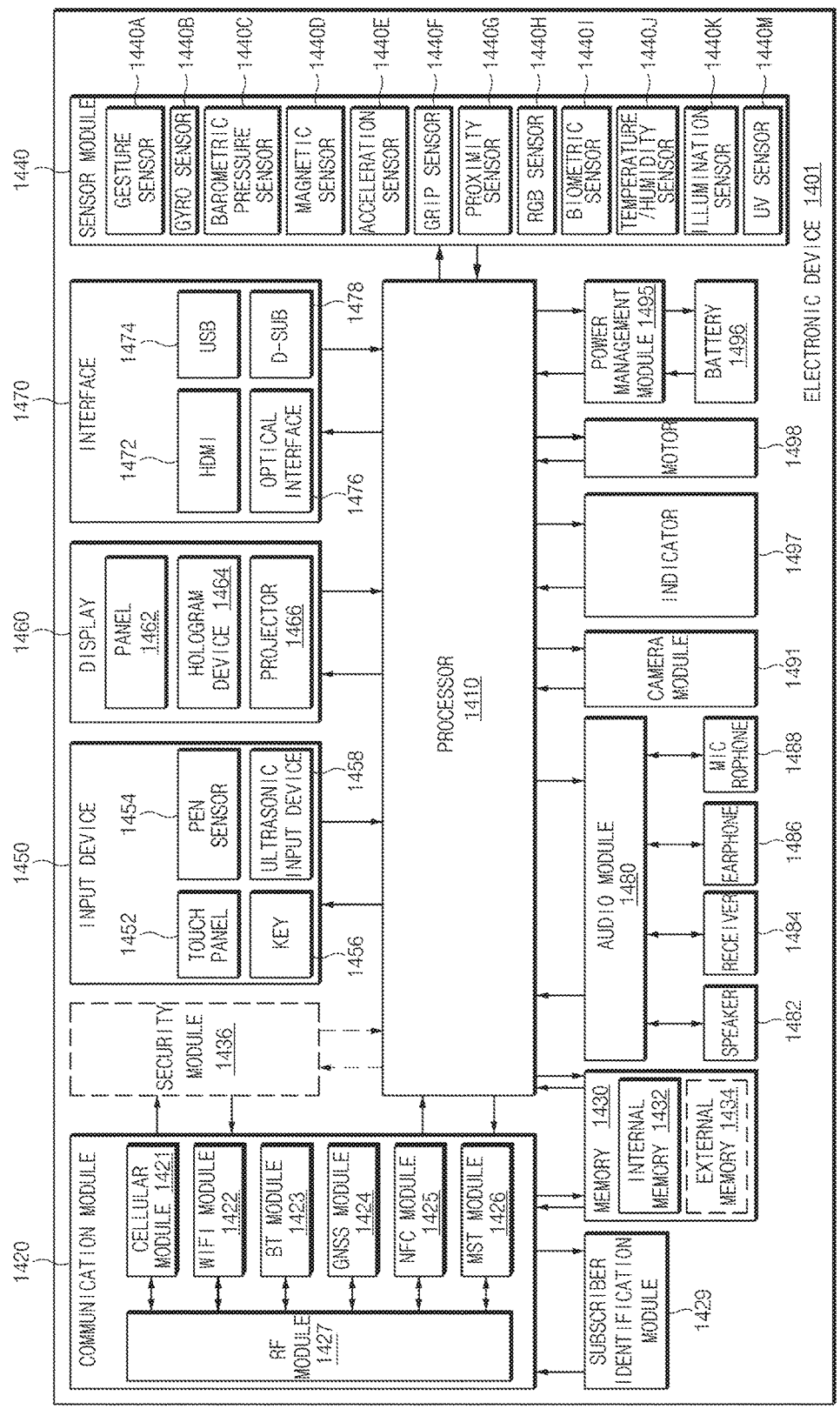
FIG. 14 illustrates a block diagram of an electronic apparatus according to an embodiment of the present disclosure.

FIG. 14 illustrates a block diagram of an electronic device, according to an embodiment of the present disclosure.

Referring to FIG. 14, an electronic device 1401 may include, for example, all or a part of the electronic device 1301 illustrated in FIG. 13. The electronic device 1401 may include one or more processors (e.g., an AP) 1410, a communication module 1420, a subscriber identification module 1429, a memory 1430, a sensor module 1440, an input device 1450, a display 1460, an interface 1470, an audio module 1480, a camera module 1491, a power management module 1495, a battery 1496, an indicator 1497, and a motor 1498.

The processor 1410 may drive, for example, an OS or an application to control a plurality of hardware or software elements connected to the processor 1410 and may process and compute a variety of data. For example, the processor 1410 may be implemented with a system on chip (SoC). According to an embodiment, the processor 1410 may further include a graphic processing unit (GPU) and/or an image signal processor (ISP). The processor 1410 may include at least a part (e.g., a cellular module 1421) of elements illustrated in FIG. 14. The processor 1410 may load an instruction or data, which is received from at least one of other elements (e.g., a nonvolatile memory), into a volatile memory and process the loaded instruction or data. The processor 1410 may store a variety of data in the nonvolatile memory.

The communication module 1420 may be configured the same as or similar to the communication interface 1370 of FIG. 13. The communication module 1420 may include the cellular module 1421, a Wi-Fi module 1422, a BT module 1423, a GNSS module 1424 (e.g., a GPS module, a Glonass module, a Beidou module, or a Galileo module), a NFC module 1425, a MST module 1426 and a radio frequency (RF) module 1427.

The cellular module 1421 may provide, for example, voice communication, video communication, a character service, an Internet service, or the like over a communication network. According to an embodiment, the cellular module 1421 may perform discrimination and authentication of the electronic device 1401 within a communication network by using the subscriber identification module (e.g., a SIM card) 1429. According to an embodiment, the cellular module 1421 may perform at least a portion of functions that the processor 1410 provides. According to an embodiment, the cellular module 1421 may include a CP.

Each of the Wi-Fi module 1422, the BT module 1423, the GNSS module 1424, the NFC module 1425, or the MST module 1426 may include a processor for processing data exchanged through a corresponding module, for example. According to an embodiment, at least a part (e.g., two or more) of the cellular module 1421, the Wi-Fi module 1422, the BT module 1423, the GNSS module 1424, the NFC module 1425, or the MST module 1426 may be included within one integrated circuit (IC) or an IC package.

For example, the RF module 1427 may transmit and receive a communication signal (e.g., an RF signal). For example, the RF module 1427 may include a transceiver, a power amplifier module (PAM), a frequency filter, a low noise amplifier (LNA), an antenna, or the like. According to another embodiment, at least one of the cellular module 1421, the Wi-Fi module 1422, the BT module 1423, the GNSS module 1424, the NFC module 1425, or the MST module 1426 may transmit and receive an RF signal through a separate RF module.

The subscriber identification module 1429 may include, for example, a card and/or embedded SIM that includes a subscriber identification module and may include unique identify information (e.g., integrated circuit card identifier (ICCID)) or subscriber information (e.g., integrated mobile subscriber identity (IMSI)).

The memory 1430 (e.g., the memory 1330) may include an internal memory 1432 or an external memory 1434. For example, the internal memory 1432 may include at least one of a volatile memory (e.g., a dynamic random access memory (DRAM), a static RAM (SRAM), a synchronous DRAM (SDRAM), or the like), a nonvolatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory or a NOR flash memory), or the like), a hard drive, or a solid state drive (SSD).

The external memory 1434 may further include a flash drive such as compact flash (CF), secure digital (SD), micro-SD, ini-SD, extreme digital (xD), a multimedia card (MMC), a memory stick, or the like. The external memory 1434 may be operatively and/or physically connected to the electronic device 1401 through various interfaces.

A security module 1436 may be a module that includes a storage space of which a security level is higher than that of the memory 1430 and may be a circuit that guarantees safe data storage and a protected execution environment. The security module 1436 may be implemented with a separate circuit and may include a separate processor. For example, the security module 1436 may be in a smart chip or a SD card, which is removable, or may include an embedded secure element (eSE) embedded in a fixed chip of the electronic device 1401. Furthermore, the security module 1436 may operate based on an OS that is different from the OS of the electronic device 1401. For example, the security module 1436 may operate based on java card open platform (JCOP) OS.

The sensor module 1440 may measure, for example, a physical quantity or may detect an operation state of the electronic device 1401. The sensor module 1440 may convert the measured or detected information to an electric signal. For example, the sensor module 1440 may include at least one of a gesture sensor 1440A, a gyro sensor 1440B, a barometric pressure sensor 1440C, a magnetic sensor 1440D, an acceleration sensor 1440E, a grip sensor 1440F, the proximity sensor 1440G, a color sensor 1440H (e.g., red, green, blue (RGB) sensor), a biometric sensor 14401, a temperature/humidity sensor 1440J, an illuminance sensor 1440K, or an UV sensor 1440M. Although not illustrated, additionally or generally, the sensor module 1440 may further include, for example, an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 1440 may further include a control circuit for controlling at least one or more sensors included therein. According to an embodiment, the electronic device 1401 may further include a processor that is a part of the processor 1410 or independent of the processor 1410 and is configured to control the sensor module 1440. The processor may control the sensor module 1440 while the processor 1410 remains at a sleep state.

The input device 1450 may include, for example, a touch panel 1452, a (digital) pen sensor 1454, a key 1456, or an ultrasonic input unit 1458. For example, the touch panel 1452 may use at least one of capacitive, resistive, infrared and ultrasonic detecting methods. Also, the touch panel 1452 may further include a control circuit. The touch panel 1452 may further include a tactile layer to provide a tactile reaction to a user.

The (digital) pen sensor 1454 may be, for example, a part of a touch panel or may include an additional sheet for recognition. The key 1456 may include, for example, a physical button, an optical key, a keypad, or the like. The ultrasonic input device 1458 may detect (or sense) an ultrasonic signal, which is generated from an input device, through a microphone (e.g., a microphone 1488) and may check data corresponding to the detected ultrasonic signal.

The display 1460 (e.g., the display 1360) may include a panel 1462, a hologram device 1464, or a projector 1466. The panel 1462 may be the same as or similar to the display 1360 illustrated in FIG. 13. The panel 1462 may be implemented, for example, to be flexible, transparent or wearable. The panel 1462 and the touch panel 1452 may be integrated into a single module. The hologram device 1464 may display a stereoscopic image in a space using a light interference phenomenon. The projector 1466 may project light onto a screen so as to display an image. For example, the screen may be arranged in the inside or the outside of the electronic device 1401. According to an embodiment, the display 1460 may further include a control circuit for controlling the panel 1462, the hologram device 1464, or the projector 1466.

The interface 1470 may include, for example, a HDMI 1472, a USB 1474, an optical interface 1476, or a D-sub-miniature (D-sub) 1478. The interface 1470 may be included, for example, in the communication interface 1370 illustrated in FIG. 13. Additionally or generally, the interface 1470 may include, for example, a mobile high definition link (MHL) interface, a SD card/MMC interface, or an infrared data association (IrDA) standard interface.

The audio module 1480 may convert a sound and an electric signal in dual directions. At least a part of the audio module 1480 may be included, for example, in the input/output interface 1350 illustrated in FIG. 13. The audio module 1480 may process, for example, sound information that is input or output through a speaker 1482, a receiver 1484, an earphone 1486, or the microphone 1488.

For example, the camera module 1491 may shoot a still image or a video. According to an embodiment, the camera module 1491 may include at least one or more image sensors (e.g., a front sensor or a rear sensor), a lens, an ISP, or a flash (e.g., an LED or a xenon lamp).

The power management module 1495 may manage, for example, power of the electronic device 1401. According to an embodiment, a power management integrated circuit (PMIC), a charger IC, or a battery or fuel gauge may be included in the power management module 1495. The PMIC may have a wired charging method and/or a wireless charging method. The wireless charging method may include, for example, a magnetic resonance method, a magnetic induction method or an electromagnetic method and may further include an additional circuit, for example, a coil loop, a resonant circuit, or a rectifier, and the like. The battery gauge may measure, for example, a remaining capacity of the battery 1496 and a voltage, current or temperature thereof while the battery is charged. The battery 1496 may include, for example, a rechargeable battery and/or a solar battery.

The indicator 1497 may display a specific state of the electronic device 1401 or a part thereof (e.g., the processor 1410), such as a booting state, a message state, a charging state, and the like. The motor 1498 may convert an electrical signal into a mechanical vibration and may generate the following effects: vibration, haptic, and the like. Although not illustrated, a processing device (e.g., a GPU) for supporting a mobile TV may be included in the electronic device 1401. The processing device for supporting the mobile TV may process media data according to the standards of digital multimedia broadcasting (DMB), digital video broadcasting (DVB), MediaFlo™, or the like.

Each of the above-mentioned elements of the electronic device according to various embodiments of the present disclosure may be configured with one or more components, and the names of the elements may be changed according to the type of the electronic device. In an embodiment, the electronic device may include at least one of the above-mentioned elements, and some elements may be omitted or other additional elements may be added. Furthermore, some of the elements of the electronic device according to an embodiment may be combined with each other so as to form one entity, so that the functions of the elements may be performed in the same manner as before the combination.

Figure 15:
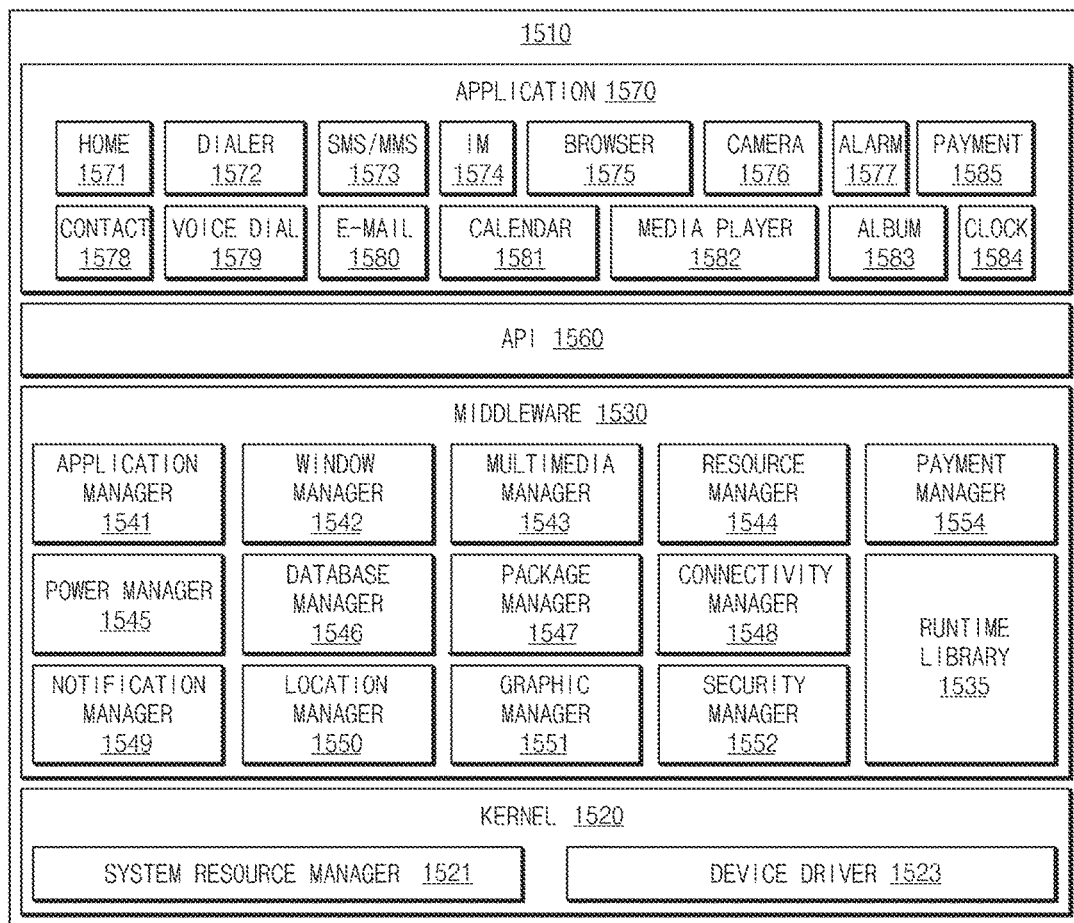
FIG. 15 illustrates a block diagram of a program module, according to an embodiment of the present disclosure.

FIG. 15 illustrates a block diagram of a program module, according to various embodiments of the present disclosure.

Referring to FIG. 15, a program module 1510 (e.g., the program 1340) may include an OS to control resources associated with an electronic device (e.g., the electronic device 1301), and/or diverse applications (e.g., the application program 1347) driven on the OS. The OS may be, for example, Android, iOS, Windows, Symbian, or Tizen.

The program module 1510 may include a kernel 1520, a middleware 1530, an API 1560, and/or an application 1570. At least a portion of the program module 1510 may be preloaded on an electronic device or may be downloadable from an external electronic device (e.g., the first electronic device 1302, the second electronic device 1304, the server 1306, or the like).

The kernel 1520 (e.g., the kernel 1341) may include, for example, a system resource manager 1521 or a device driver 1523. The system resource manager 1521 may perform control, allocation, or retrieval of system resources. According to an embodiment, the system resource manager 1521 may include a process managing unit, a memory managing unit, or a file system managing unit. The device driver 1523 may include, for example, a display driver, a camera driver, a BT driver, a shared memory driver, a USB driver, a keypad driver, a Wi-Fi driver, an audio driver, or an inter-process communication (IPC) driver.

The middleware 1530 may provide, for example, a function that the application 1570 needs in common, or may provide diverse functions to the application 1570 through the API 1560 to allow the application 1570 to efficiently use limited system resources of the electronic device. According to an embodiment, the middleware 1530 (e.g., the middleware 1343) may include at least one of a runtime library 1535, an application manager 1541, a window manager 1542, a multimedia manager 1543, a resource manager 1544, a power manager 1545, a database manager 1546, a package manager 1547, a connectivity manager 1548, a notification manager 1549, a location manager 1550, a graphic manager 1551, a security manager 1552, or a payment manager 1554.

The runtime library 1535 may include, for example, a library module that is used by a compiler to add a new function through a programming language while the application 1570 is being executed. The runtime library 1535 may perform input/output management, memory management, or capacities about arithmetic functions.

The application manager 1541 may manage, for example, a life cycle of at least one application of the application 1570. The window manager 1542 may manage a graphic user interface (GUI) resource that is used in a screen. The multimedia manager 1543 may identify a format necessary for playing diverse media files, and may perform encoding or decoding of media files by using a codec suitable for the format. The resource manager 1544 may manage resources such as a storage space, memory, or source code of at least one application of the application 1570.

The power manager 1545 may operate, for example, with a basic input/output system (BIOS) to manage a battery or power, and may provide power information for an operation of an electronic device. The database manager 1546 may generate, search for, or modify database that is to be used in at least one application of the application 1570. The package manager 1547 may install or update an application that is distributed in the form of package file.

The connectivity manager 1548 may manage, for example, wireless connection such as Wi-Fi or BT. The notification manager 1549 may display or notify an event such as arrival message, appointment, or proximity notification in a mode that does not disturb a user. The location manager 1550 may manage location information about an electronic device. The graphic manager 1551 may manage a graphic effect that is provided to a user, or manage a user interface relevant thereto. The security manager 1552 may provide a general security function necessary for system security, user authentication, or the like. According to an embodiment, in the case where an electronic device (e.g., the electronic device 1301) includes a telephony function, the middleware 1530 may further include a telephony manager for managing a voice or video call function of the electronic device.

The middleware 1530 may include a middleware module that combines diverse functions of the above-described elements. The middleware 1530 may provide a module specialized to each OS kind to provide differentiated functions. Additionally, the middleware 1530 may dynamically remove a part of the preexisting elements or may add new elements thereto.

The API 1560 (e.g., the API 1345) may be, for example, a set of programming functions and may be provided with a configuration that is variable depending on an OS. For example, in the case where an OS is the android or the iOS, it may provide one API set per platform. In the case where an OS is the tizen, it may provide two or more API sets per platform.

The application 1570 (e.g., the application program 1347) may include, for example, one or more applications capable of providing functions for a home 1571, a dialer 1572, a short message service (SMS)/multimedia message service (MMS) 1573, an instant message (IM) 1574, a browser 1575, a camera 1576, an alarm 1577, a contact 1578, a voice dial 1579, an e-mail 1580, a calendar 1581, a media player 1582, an album 1583, a timepiece 1584, and a payment 1585 or for offering health care (e.g., measuring an exercise quantity, blood sugar, or the like) or environment information (e.g., information of barometric pressure, humidity, temperature, or the like).

According to an embodiment, the application 1570 may include an application (hereinafter referred to as "information exchanging application" for descriptive convenience) to support information exchange between an electronic device (e.g., the electronic device 1301) and an external electronic device (e.g., the first electronic device 1302 or the second electronic device 1304). The information exchanging application may include, for example, a notification relay application for transmitting specific information to an external electronic device, or a device management application for managing the external electronic device.

For example, the notification relay application may include a function of transmitting notification information, which arise from other applications (e.g., applications for SMS/MMS, e-mail, health care, or environmental information), to an external electronic device. Additionally, the information exchanging application may receive, for example, notification information from an external electronic device and provide the notification information to a user.

The device management application may manage (e.g., install, delete, or update), for example, at least one function (e.g., turn-on/turn-off of an external electronic device itself (or a part of elements) or adjustment of brightness (or resolution) of a display) of the external electronic device which communicates with the electronic device, an application running in the external electronic device, or a service (e.g., a call service, a message service, or the like) provided from the external electronic device.

According to an embodiment, the application 1570 may include an application (e.g., a health care application of a mobile medical device) that is assigned in accordance with an attribute of an external electronic device. According to an embodiment, the application 1570 may include an application that is received from an external electronic device (e.g., the first electronic device 1302, the second electronic device 1304, or the server 1306). According to an embodiment, the application 1570 may include a preloaded application or a third party application that is downloadable from a server. The names of elements of the program module 1510 according to the embodiment may be modifiable depending on kinds of OSs.

According to an embodiment, at least a portion of the program module 1510 may be implemented by software, firmware, hardware, or a combination of two or more thereof. At least a portion of the program module 1510 may be implemented (e.g., executed), for example, by the processor (e.g., the processor 1410). At least a portion of the program module 1510 may include, for example, modules, programs, routines, sets of instructions, processes, or the like for performing one or more functions.

The term "module" used in this disclosure may represent, for example, a unit including one or more combinations of hardware, software and firmware. The term "module" may be interchangeably used with the terms "unit", "logic", "logical block", "component" and "circuit". The "module" may be a minimum unit of an integrated component or may be a part thereof. The "module" may be a minimum unit for performing one or more functions or a part thereof. The "module" may be implemented mechanically or electronically. For example, the "module" may include at least one of an application-specific IC (ASIC) chip, a field-programmable gate array (FPGA), and a programmable-logic device for performing some operations, which are known or will be developed.

At least a part of an apparatus (e.g., modules or functions thereof) or a method (e.g., operations) according to an embodiment may be, for example, implemented by instructions stored in a computer-readable storage media in the form of a program module. The instruction, when executed by a processor (e.g., the processor 1320), may cause the one or more processors to perform a function corresponding to the instruction. The computer-readable storage media, for example, may be the memory 1330.

A computer-readable recording medium may include a hard disk, a floppy disk, a magnetic media (e.g., a magnetic tape), an optical media (e.g., a compact disc read only memory (CD-ROM) and a DVD, a magneto-optical media (e.g., a floptical disk)), and hardware devices (e.g., a read only memory (ROM), a random access memory (RAM), or a flash memory). Also, a program instruction may include not only a mechanical code such as things generated by a compiler but also a high-level language code executable on a computer using an interpreter. The above hardware unit may be configured to operate via one or more software modules for performing an operation according to various embodiments, and vice versa.

A module or a program module according to various embodiments may include at least one of the above elements, or a part of the above elements may be omitted, or additional other elements may be further included. Operations performed by a module, a program module, or other elements according to various embodiments may be executed sequentially, in parallel, repeatedly, or in a heuristic method. In addition, some operations may be executed in different sequences or may be omitted. Alternatively, other operations may be added.

According to various embodiments of the present disclosure, a fingerprint recognition rate may increase by displaying a guide in a fingerprint sensing region and by obtaining fingerprint information through the guide.

According to various embodiments of the present disclosure, in the case where the fingerprint information is insufficient, a fingerprint of various regions may be obtained by displaying a new guide and by additionally obtaining fingerprint information.

Besides, a variety of effects directly or indirectly understood through this disclosure may be provided.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic apparatus comprising:
   a touch screen;
   an optical fingerprint sensor disposed underneath the touch screen; and
   at least one processor, coupled with the touch screen and the optical fingerprint sensor, configured to perform a fingerprint registration of a finger by:
      displaying a first guide at a first area on the touch screen, the first area at least partly overlapping with a fingerprint sensing region corresponding to the optical fingerprint sensor,
      identifying a position of a first touch of the finger guided by the displayed first guide via the touch screen, based at least on the position of the first touch corresponding to the first area, controlling the touch screen to irradiate light at least over the fingerprint sensing region and obtaining, via the optical fingerprint sensor using at least part of the light irradiated by the touch screen, first fingerprint information corresponding to the first touch, in response to the first fingerprint information being obtained via the optical fingerprint sensor, displaying a second guide at a second area on the touch screen, the second area at least partly overlapping the fingerprint sensing region, identifying a position of a second touch of the finger guided by the displayed second guide via the touch screen, and based at least on the position of the second touch corresponding to the second area, controlling the touch screen to irradiate light at least over the fingerprint sensing region and obtaining, via the fingerprint sensor using at least part of the light irradiated by the touch screen, second fingerprint information corresponding to the second touch, wherein a position of the first area relative to the fingerprint sensing region over which light from the touch screen is to be irradiated is different from a position of the second area relative to the fingerprint sensing region over which light from the touch screen is to be irradiated.

2. The electronic apparatus of claim 1, wherein the at least one processor is further configured to perform the fingerprint registration of the finger by:
controlling the touch screen to maintain displaying the first guide at the first area without obtaining any fingerprint information via the optical fingerprint sensor if the position of the first touch is not corresponding to the first area.

3. The electronic apparatus of claim 1, wherein the at least one processor is further configured to perform the fingerprint registration of the finger by:
identifying a size of the first touch guided by the displayed first guide via the touch screen, and
controlling the touch screen to irradiate light at least over the fingerprint sensing region when the position of the first touch corresponds to the first area and the size of the first touch is in a specific size range.

4. The electronic apparatus of claim 3, wherein the at least one processor is further configured to perform the fingerprint registration of the finger by:
controlling the touch screen to maintain displaying the first guide at the first area without obtaining any fingerprint information when the position of the first touch corresponds to the first area and the size of the first touch is out of the specific size range.

5. The electronic apparatus of claim 1, wherein the at least one processor is further configured to perform the fingerprint registration of the finger by:
based at least on the obtained first fingerprint information and the obtained second fingerprint information, generating fingerprint information, and
storing the generated fingerprint information in a memory.

6. The electronic apparatus of claim 1, wherein the touch screen includes a plurality of pixels,
wherein the at least one processor is further configured to perform the fingerprint registration of the finger by controlling at least one pixel corresponding to the fingerprint sensing region to irradiate the light.

7. The electronic apparatus of claim 1,
wherein the at least one processor is further configured to perform the fingerprint registration of the finger by:
in response to the second fingerprint information being obtained via the optical fingerprint sensor, displaying a third guide at a third area on the touch screen, the third area at least partly overlapping the fingerprint sensing region, identifying a position of a third touch of the finger guided by the displayed third guide via the touch screen, and based at least on the position of the third touch corresponding to the third area, controlling the touch screen to irradiate light at least over the fingerprint sensing region and obtaining, via the fingerprint sensor using at least part of the light irradiated by the touch screen, third fingerprint information corresponding to the third touch, and wherein a position of the third area relative to the fingerprint sensing region over which light from the touch screen is to be irradiated is different from the position of the first area relative to the fingerprint sensing region over which light from the touch screen is to be irradiated and the position of the second area relative to the fingerprint sensing region over which light from the touch screen is to be irradiated.

8. The electronic apparatus of claim 7, wherein the at least one processor is further configured to perform the fingerprint registration of the finger by:
based at least on the obtained first, second, and third fingerprint information, identifying an additional area to obtain additional fingerprint information,
displaying an additional guide at the additional area on the touch screen, the additional guide at least partly overlapping with the fingerprint sensing region,
identifying a position of an additional touch of the finger guided by the displayed additional guide via the touch screen,
based at least on the position of the additional touch corresponding to the additional area, controlling the touch screen to irradiate light at least over the fingerprint sensing region and obtaining, via the fingerprint sensor using at least part of the light irradiated by the touch screen, the additional fingerprint information corresponding to the additional touch, and
based at least on the obtained first, second, third, and additional fingerprint information, generating fingerprint information and storing the generated fingerprint information in a memory.

9. The electronic apparatus of claim 7, wherein in the position of the first area, the position of the second area, and the position of the third area are arranged in a predetermined direction.

10. The electronic apparatus of claim 7, wherein the first guide, the second guide, and the third guide are fingerprint-shaped.

11. An electronic apparatus comprising:
a touch screen;
an optical fingerprint sensor disposed underneath the touch screen; and
at least one processor, coupled with the touch screen and the optical fingerprint sensor, configured to perform a fingerprint registration of a finger by:
displaying a guide at a first area on the touch screen, the first area at least partly overlapping with the optical fingerprint sensor when viewed from above the touch screen, controlling the touch screen to irradiate light and obtaining, via the optical fingerprint sensor using at least part of the light irradiated by the touch screen, first fingerprint information corresponding to the first area if a user's finger is touched on the guide, and moving the guide to a second area on the touch screen when the first fingerprint information is obtained, the second area at least partly overlapping with the optical fingerprint sensor when viewed from above the touch screen, wherein a position of the first area is different from a position of the second area.

12. The electronic apparatus of claim 11, wherein the at least one processor is further configured to perform the fingerprint registration of the finger by:

controlling the touch screen to irradiate light and obtain, via the optical fingerprint sensor using at least part of the light irradiated by the touch screen, second fingerprint information corresponding to the second area if the user's finger is touched on the guide.

13. The electronic apparatus of claim 12, wherein the at least one processor is further configured to perform the fingerprint registration of the finger by:

moving the guide to a third area on the touch screen when the first fingerprint information and the second fingerprint information does not satisfy a requirement.

14. The electronic apparatus of claim 12, wherein the at least one processor is further configured to perform the fingerprint registration of the finger by:

generating a fingerprint information based at least on the first fingerprint information and the second fingerprint information and storing the generated fingerprint information in a memory.

15. The electronic apparatus of claim 11, wherein the at least one processor is further configured to perform the fingerprint registration of the finger by:

controlling the touch screen to irradiate light if a size of an area where the user's finger is touched is greater than a first size.

16. The electronic apparatus of claim 15, wherein the at least one processor is further configured to perform the fingerprint registration of the finger by:

controlling the touch screen to maintain displaying the guide at the first area without obtaining any fingerprint information when a size of an area where the user's finger is touched is smaller than the first size.

17. The electronic apparatus of claim 11, wherein the at least one processor is further configured to perform the fingerprint registration of the finger by:

maintaining displaying the guide at the first area while the first fingerprint information is not obtained.

18. The electronic apparatus of claim 12, wherein the at least one processor is further configured to perform the fingerprint registration of the finger by:

moving the guide to a third area on the touch screen when the second fingerprint information is obtained, the third area at least partly overlapping with the optical fingerprint sensor when viewed from above the touch screen, controlling the touch screen to irradiate light and obtaining, via the optical fingerprint sensor using at least part of the light irradiated by the touch screen, third fingerprint information corresponding to the third area if the user's finger is touched on the guide, based at least on the obtained first, second, and third fingerprint information, identifying an additional area to obtain additional fingerprint information, moving the guide to the additional area on the touch screen, the additional guide at least partly overlapping with the optical fingerprint sensor when viewed from above the touch screen, controlling the touch screen to irradiate light and obtaining, via the optical fingerprint sensor using at least part of the light irradiated by the touch screen, the additional fingerprint information corresponding to the additional area if the user's finger is touched on the guide, and based at least on the obtained first, second, third, and additional fingerprint information, generating fingerprint information and storing the generated fingerprint information in a memory, and wherein a position of the third area is different from the position of the first area and the position of the second area.

19. The electronic apparatus of claim 11, wherein the at least one processor is further configured to perform the fingerprint registration of the finger by:

moving the guide continuously from the first area to the second area.

20. The electronic apparatus of claim 11, wherein in the position of the first area and the position of the second area are arranged in a predetermined order.

21. The electronic apparatus of claim 7, wherein the at least one processor is further configured to perform the fingerprint registration of the finger by:

based at least on the obtained first fingerprint information, the obtained second fingerprint information, and the obtained third fingerprint information, generating fingerprint information, and storing the generated fingerprint information in a memory.

22. The electronic apparatus of claim 1, wherein the second area is at least partially to a left of the optical fingerprint sensor and the displayed second guide is displayed at least partially to the left of the optical fingerprint sensor, and wherein the second fingerprint information corresponding to the second touch comprises fingerprint information corresponding to a right portion of a fingerprint of the finger.

23. The electronic apparatus of claim 1, wherein the second area is an area at least partially further towards a top of the touch screen than the optical fingerprint sensor and the displayed second guide is displayed at least partially further towards the top of the touch screen than the optical fingerprint sensor, and wherein the second fingerprint information corresponding to the second touch comprises fingerprint information corresponding to a bottom portion of a fingerprint of the finger.

24. The electronic apparatus of claim 1, wherein the second area is an area at least partially further towards a bottom of the touch screen than the optical fingerprint sensor and the displayed second guide is displayed at least partially further towards the bottom of the touch screen than the optical fingerprint sensor, and wherein the second fingerprint information corresponding to the second touch comprises fingerprint information corresponding to a top portion of a fingerprint of the finger.

25. The electronic apparatus of claim 1, wherein the second area is determined by the at least one processor based on an area of fingerprint information of the finger to be obtained.

26. The electronic apparatus of claim 1,
wherein the second area is an area substantially over the optical fingerprint sensor and the displayed second guide is displayed substantially over the fingerprint sensing region, and
wherein the second fingerprint information corresponding to the second touch comprises fingerprint information corresponding to a center portion of a fingerprint of the finger.

27. The electronic apparatus of claim 1, wherein the at least one processor is further configured to perform the fingerprint registration of the finger by sequentially providing a plurality of additional guides, each additional guide at least partially overlapping the fingerprint sensing region, a location of each additional guide determined by the at least one processor based on an area of fingerprint information of the finger to be obtained.

28. The electronic apparatus of claim 27, wherein the at least one processor is further configured to provide additional guides until substantially all of the fingerprint information of the finger has been obtained.

29. The electronic apparatus of claim 11,
wherein the second area is at least partially to a left of the optical fingerprint sensor and when the guide is displayed in the second area, the guide is displayed at least partially to the left of the optical fingerprint sensor, and
wherein second fingerprint information corresponding to a second touch in the second area comprises fingerprint information corresponding to a right portion of a fingerprint of the finger.

30. The electronic apparatus of claim 11,
wherein the second area is an area at least partially further towards a top of the touch screen than the optical fingerprint sensor and when the guide is displayed in the second area, the guide is displayed at least partially further towards the top of the touch screen than the optical fingerprint sensor, and
wherein second fingerprint information corresponding to a second touch in the second area comprises fingerprint information corresponding to a bottom portion of a fingerprint of the finger.

31. The electronic apparatus of claim 11,
wherein the second area is an area at least partially further towards a bottom of the touch screen than the optical fingerprint sensor and when the guide is displayed in the second area, the guide is displayed at least partially further towards the bottom of the touch screen than the optical fingerprint sensor, and
wherein second fingerprint information corresponding to a second touch in the second area comprises fingerprint information corresponding to a top portion of a fingerprint of the finger.

32. The electronic apparatus of claim 11,
wherein the second area is determined by the at least one processor based on an area of fingerprint information of the finger to be obtained.

33. The electronic apparatus of claim 11,
wherein the second area is an area substantially over the optical fingerprint sensor and the displayed second guide is displayed substantially over the fingerprint sensor, and
wherein second fingerprint information corresponding to a second touch in the second area comprises fingerprint information corresponding to a center portion of a fingerprint of the finger.

34. The electronic apparatus of claim 11, wherein the at least one processor is further configured to perform the fingerprint registration of the finger by sequentially providing a plurality of additional guides, each additional guide at least partially overlapping the fingerprint sensor, a location of each additional guide determined by the at least one processor based on an area of fingerprint information of the finger to be obtained.

35. The electronic apparatus of claim 34, wherein the at least one processor is further configured to provide additional guides until substantially all of the fingerprint information of the finger has been obtained.

\* \* \* \* \*